United States Patent
Zhao et al.

(10) Patent No.: US 11,477,777 B2
(45) Date of Patent: Oct. 18, 2022

(54) INFORMATION TRANSMISSION METHOD AND DEVICE

(71) Applicant: Huawei Technologies Co., Ltd., Shenzhen (CN)

(72) Inventors: Yue Zhao, Beijing (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 17/063,247

(22) Filed: Oct. 5, 2020

(65) Prior Publication Data

US 2021/0022126 A1 Jan. 21, 2021

Related U.S. Application Data

(63) Continuation of application No. PCT/CN2018/083623, filed on Apr. 18, 2018.

(30) Foreign Application Priority Data

Apr. 4, 2018 (CN) .................. PCT/CN2018/082056

(51) Int. Cl.
  *H04W 4/00* (2018.01)
  *H04W 72/04* (2009.01)
  (Continued)

(52) U.S. Cl.
  CPC .......... *H04W 72/042* (2013.01); *H04L 5/001* (2013.01); *H04L 27/206* (2013.01); *H04W 72/0453* (2013.01); *H04W 74/006* (2013.01)

(58) Field of Classification Search
  None
  See application file for complete search history.

(56) References Cited

U.S. PATENT DOCUMENTS

| | | | | |
|---|---|---|---|---|
| 11,039,460 B2* | 6/2021 | Shin | ...................... | H04L 1/0061 |
| 11,160,094 B2* | 10/2021 | Shin | ...................... | H04W 72/00 |
| 2018/0049169 A1* | 2/2018 | Lin | ...................... | H04L 5/0007 |
| 2018/0049176 A1* | 2/2018 | Park | ...................... | H04L 5/0053 |
| 2018/0049201 A1 | 2/2018 | Hussain et al. | | |
| 2019/0223197 A1* | 7/2019 | Shin | ...................... | H04W 24/08 |

(Continued)

FOREIGN PATENT DOCUMENTS

| CN | 102123019 A | 7/2011 |
|---|---|---|
| CN | 102237985 A | 11/2011 |

(Continued)

OTHER PUBLICATIONS

"DCI content for MTC and coverage enhancement," 3GPP TSG RAN WG1 Meeting #82, Beijing, China, R1-154602, total 5 pages, 3rd Generation Partnership Project, Valbonne, France (Aug. 24-28, 2015).

(Continued)

*Primary Examiner* — Bob A Phunkulh
(74) *Attorney, Agent, or Firm* — Leydig, Voit & Mayer, Ltd.

(57) ABSTRACT

An information transmission method and a device are provided. The information transmission method includes: receiving, by a terminal device, downlink control information sent by a network device, the downlink control information including a resource allocation field, the resource allocation field being used to indicate allocated resource block(s) or a subcarrier resource. The method further includes determining, by the terminal device, an allocated resource based on the downlink control information, and sending information on the allocated resource. According to the method and the device provided in embodiments of this application, a coverage capability of a network is improved, and the method and the device may be applied to the internet of things, for example, MTC, IoT, LTE-M, and M2M.

20 Claims, 5 Drawing Sheets

(51) Int. Cl.
*H04L 5/00* (2006.01)
*H04L 27/20* (2006.01)
*H04W 74/00* (2009.01)

(56) References Cited

U.S. PATENT DOCUMENTS

| | | | | |
|---|---|---|---|---|
| 2020/0187170 | A1* | 6/2020 | Shin | H04W 72/042 |
| 2020/0196281 | A1* | 6/2020 | Bergman | H04W 72/048 |
| 2020/0403760 | A1* | 12/2020 | Ratasuk | H04L 5/0094 |
| 2022/0061056 | A1* | 2/2022 | Farag | H04W 72/042 |

FOREIGN PATENT DOCUMENTS

| | | |
|---|---|---|
| CN | 102263622 A | 11/2011 |
| CN | 103095437 A | 5/2013 |
| CN | 106162897 A | 11/2016 |
| CN | 107197524 A | 9/2017 |
| CN | 107734692 A | 2/2018 |
| CN | 107872779 A | 4/2018 |
| CN | 103931250 B | 9/2018 |
| CN | 107006032 B | 5/2020 |
| GB | 2541213 A | 2/2017 |
| KR | 20110083674 A | 7/2011 |
| KR | 20140098157 A | 8/2014 |
| KR | 20180018987 A | 2/2018 |

OTHER PUBLICATIONS

"On Sub-RB resource allocation for MTC PUSCH," 3GPP TSG RAN WG1 Meeting #92, Athens, Greece, R1-1801432, total 7 pages, 3rd Generation Partnership Project, Valbonne, France (Feb. 26-Mar. 2, 2018).

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.1.0, total 234 pages, 3rd Generation Partnership Project, Valbonne, France (Mar. 2018).

"Design of PUSCH Sub-PRB allocation for MTC," 3GPP TSG RAN WG1 Meeting #92, Athens, Greece, R1-1801600, total 7 pages, 3rd Generation Partnership Project, Valbonne, France (Feb. 26-Mar. 2, 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, 3rd Generation Partnership Project, Valbonne, France (Mar. 2018).

Huawei, HiSilicon, "Resource allocation for supporting larger PUSCH channel bandwidths," 3GPP TSG RAN WG1 Meeting #88, Athens, Greece, R1-1701759, total 5 pages, 3rd Generation Partnership Project, Valbonne, France (Feb. 13-17, 2017).

"3rd Generation Partnership Project; Technical Specification Group Radio Access Network; Evolved Universal Terrestrial Radio Access (E-UTRA); Multiplexing and channel coding (Release 15)," 3GPP TS 36.212, V15.0.1, total 214 pages, 3rd Generation Partnership Project, Valbonne, France (Jan. 2018).

Intel Corporation, "Design of sub-PRB PUSCH for efeMTC," 3GPP TSG RAN WG1 #92, Athens, Greece, R1-1802375, total 9 pages, 3rd Generation Partnership Project, Valbonne, France (Feb. 26-Mar. 2, 2018).

* cited by examiner

INFORMATION TRANSMISSION METHOD AND DEVICE

CROSS-REFERENCE TO RELATED APPLICATIONS

This application is a continuation of International Application No. PCT/CN2018/083623, filed on Apr. 18, 2018, which claims priority to International Application No. PCT/CN2018/082056, filed on Apr. 4, 2018. The disclosures of the aforementioned applications are hereby incorporated by reference in their entireties.

TECHNICAL FIELD

Embodiments of this application relate to the communications field, and in particular, to an information transmission method and a device.

BACKGROUND

In machine type communication (MTC), various devices having perception, computing, execution, and communication capabilities are deployed to obtain information about the physical world, and information transmission, coordination, and processing are implemented by using a network, to achieve interconnection between people and things and between things and things. Currently, Rel (release)-12, Rel-13, Rel-14, and Rel-15 of long term evolution (LTE) can support an MTC service.

In Rel-14 and earlier releases, a minimum unit for allocating a resource to a physical uplink shared channel (PUSCH) is one resource block. Allocating a resource smaller than 12 subcarriers to the PUSCH is one effective technical means that may be used to improve spectral efficiency of the PUSCH.

However, allocating resources smaller than 12 subcarriers to the PUSCH is an urgent problem to be resolved.

SUMMARY

Embodiments of this application provide an information transmission method and a device, to consider a situation on a network side as much as possible, and avoid a waste of transmission resources.

According to a first aspect, an embodiment of this application provides an information transmission method, which includes:

receiving, by a terminal device, downlink control information sent by a network device, where the downlink control information includes a resource allocation field, and the resource allocation field is used to indicate allocated resource block(s) or a subcarrier resource; and when the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer; and determining, by the terminal device, an allocated resource based on the downlink control information, and sending information on the allocated resource.

In this embodiment of this application, the network device indicates, by using different values of the bit states of the resource allocation field, to allocate the resource block(s) or the subcarrier resource to the terminal device. When the resource allocation field is used to indicate the allocated resource block(s), the resource allocation field includes the $$\left\lceil \log_2 \left\lfloor \frac{N_{RB}^{UL}}{6} \right\rfloor \right\rceil$$

high-order bits and the M+X low-order bits, the $$\left\lceil \log_2 \left\lfloor \frac{N_{RB}^{UL}}{6} \right\rfloor \right\rceil$$

high-order bits indicate the index of the narrowband, the M high-order bits in the M+X low-order bits indicate the resource allocation in the narrowband, and the quantity of resource blocks indicated by the resource allocation field is greater than or equal to 1; or when the resource allocation field is used to indicate the allocated subcarrier resource, the resource allocation field includes the $$\left\lceil \log_2 \left\lfloor \frac{N_{RB}^{UL}}{6} \right\rfloor \right\rceil$$

high-order bits and the L low-order bits, the $$\left\lceil \log_2 \left\lfloor \frac{N_{RB}^{UL}}{6} \right\rfloor \right\rceil$$

high-order bits indicate the index of the narrowband, the L low-order bits indicate the subcarrier resource allocation in the K resource blocks, and the quantity of subcarriers indicated by the resource allocation field is less than 12. In this way, a resource smaller than 12 subcarriers can be allocated, so that effective resources can be allocated to more UEs, and spectral efficiency is improved.

In a possible design of the first aspect, the terminal device is at a coverage enhancement level 0 or a coverage enhancement level 1, or in a coverage enhancement mode A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In this embodiment of this application, when the first field has three bit states indicating the quantities of resource units, the resource allocation field indicates the subcarrier resource allocation. In other words, the terminal device may determine, based on a bit state of the resource allocation field, the subcarrier resource allocated by the network device to the terminal device.

In a possible design of the first aspect, a bit state 00 of the first field indicates that the resource allocation field is used to indicate the allocated resource block(s); or a bit state 11 of the first field indicates that the resource allocation field is used to indicate the allocated resource block(s).

In a possible design of the first aspect,

K=5, M=5, L=5, and the subcarrier resource indicated by the resource allocation field is three subcarriers or six subcarriers;

K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

In a possible design of the first aspect, when K=5, M=5, L=5, and the subcarrier resource allocated by using the resource allocation field is three subcarriers, the downlink control information further includes a second field, and the second field indicates the terminal device to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 binary phase shift keying (BPSK) modulation, the terminal device transmits the information by using two consecutive subcarriers in the three subcarriers, or when the modulation scheme is quadrature phase shift keying (QPSK) modulation, the terminal device transmits the information by using the three subcarriers, where Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In this embodiment of this application, the downlink control information may further carry the second field or the third field, and the network device may further indicate, by using the second field, the terminal device to transmit the information by using the three subcarriers or transmit the information by using the two consecutive subcarriers in the three subcarriers; or the terminal device may determine, by using the third field, the modulation scheme for the information transmission. For example, the modulation scheme may include the Pi/2 BPSK modulation or the QPSK modulation. In this way, the terminal device can transmit the information based on the modulation scheme indicated by the network device.

In a possible design of the first aspect, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In this embodiment of this application, the terminal device may determine, based on a value of the bit state of the fourth field, whether the resource allocation field is used to indicate the allocated resource block(s) or the allocated subcarrier resource.

In a possible design of the first aspect,

K=2, M=3, L=4, and the subcarrier resource allocated by using the resource allocation field is three subcarriers or six subcarriers; or K=2, M=3, L=5, the subcarrier resource allocated by using the resource allocation field is three subcarriers or six subcarriers, and the resource allocation field indicates a quantity of resource units.

In a possible design of the first aspect, when K=2, M=3, and L=4, or when K=3, M=3, and L=5, the downlink control information further includes a fifth field, a size of the fifth field is 1 bit, and the fifth field indicates the quantity of resource units.

According to a second aspect, an embodiment of this application provides an information transmission method, including:

determining, by a network device, to allocate resource block(s) or a subcarrier resource to a terminal device;

determining, by the network device, downlink control information, where the downlink control information includes a resource allocation field, and the resource allocation field is used to indicate the allocated resource block(s) or subcarrier resource; and when the resource allocation field is used to indicate the allocated resource block(s), the resource allocation field includes $\left\lceil \log_2 \left\lfloor \frac{N_{RB}^{UL}}{6} \right\rfloor \right\rceil$ high-order bits and M+X low-order bits, the $\left\lceil \log_2 \left\lfloor \frac{N_{RB}^{UL}}{6} \right\rfloor \right\rceil$ high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $\left\lceil \log_2 \left\lfloor \frac{N_{RB}^{UL}}{6} \right\rfloor \right\rceil$ high-order bits and L low-order bits, the $\left\lceil \log_2 \left\lfloor \frac{N_{RB}^{UL}}{6} \right\rfloor \right\rceil$ high-order bits indicate an index of a narrowband, the L low-order bits indicate subcarrier resource allocation in K resource blocks, a quantity of subcarriers indicated by the resource allocation field is less than 12, L is a positive integer, and K is a positive integer;

sending, by the network device, the downlink control information to the terminal device; and receiving, by the network device on a resource determined based on the downlink control information, information sent by the terminal device.

In a possible design of the second aspect, the terminal device is at a coverage enhancement level 0 or a coverage enhancement level 1, or in a coverage enhancement mode A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In a possible design of the second aspect, a bit state 00 of the first field indicates that the resource allocation field is used to indicate the allocated resource block(s); or a bit state 11 of the first field indicates that the resource allocation field is used to indicate the allocated resource block(s).

In a possible design of the second aspect,

K=5, M=5, L=5, and the subcarrier resource indicated by the resource allocation field is three subcarriers or six subcarriers;

K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

In a possible design of the second aspect, when K=5, M=5, L=5, and the subcarrier resource allocated by using the resource allocation field is three subcarriers, the downlink control information further includes a second field, and the second field indicates the terminal device to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, where Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In a possible design of the second aspect, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In a possible design of the second aspect,

K=2, M=3, L=4, and the subcarrier resource allocated by using the resource allocation field is three subcarriers or six subcarriers; or K=2, M=3, L=5, the subcarrier resource allocated by using the resource allocation field is three subcarriers or six subcarriers, and the resource allocation field indicates a quantity of resource units.

In a possible design of the second aspect, when K=2, M=3, and L=4, the downlink control information further includes a fifth field, a size of the fifth field is 1 bit, and the fifth field indicates the quantity of resource units.

According to a third aspect, an embodiment of this application provides a terminal device, including:

a receiving module, configured to receive downlink control information sent by a network device, where the downlink control information includes a resource allocation field, and the resource allocation field is used to indicate allocated resource block(s) or a subcarrier resource; and when the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;

a processing module, configured to determine an allocated resource based on the downlink control information; and a sending module, configured to send information on the allocated resource.

In a possible design of the third aspect, the terminal device is at a coverage enhancement level 0 or a coverage enhancement level 1, or in a coverage enhancement mode A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In a possible design of the third aspect, a bit state 00 of the first field indicates that the resource allocation field is used to indicate the allocated resource block(s); or a bit state 11 of the first field indicates that the resource allocation field is used to indicate the allocated resource block(s).

In a possible design of the third aspect,

K=5, M=5, L=5, and the subcarrier resource indicated by the resource allocation field is three subcarriers or six subcarriers;

K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

In a possible design of the third aspect, when K=5, M=5, L=5, and the subcarrier resource allocated by using the resource allocation field is three subcarriers, the downlink control information further includes a second field, and the second field indicates the terminal device to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, where Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In a possible design of the third aspect, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In a possible design of the third aspect,

K=2, M=3, L=4, and the subcarrier resource allocated by using the resource allocation field is three subcarriers or six subcarriers; or K=2, M=3, L=5, the subcarrier resource allocated by using the resource allocation field is three subcarriers or six subcarriers, and the resource allocation field indicates a quantity of resource units.

In a possible design of the third aspect, when K=2, M=3, and L=4, the downlink control information further includes a fifth field, a size of the fifth field is 1 bit, and the fifth field indicates the quantity of resource units.

In the third aspect of this application, the composition modules of the terminal device may further perform the steps described in the first aspect and the possible implementations. For details, refer to the descriptions in the first aspect and the possible implementations.

According to a fourth aspect, an embodiment of this application provides a network device, including:

a processing module, configured to determine to allocate resource block(s) or a subcarrier resource to a terminal device, where the processing module is configured to determine downlink control information, where the downlink control information includes a resource allocation field, and the resource allocation field is used to indicate the allocated resource block(s) or subcarrier resource; and when the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;

a sending module, configured to send the downlink control information to the terminal device; and a receiving module, configured to receive, on a resource determined based on the downlink control information, information sent by the terminal device.

In a possible design of the fourth aspect, the terminal device is at a coverage enhancement level 0 or a coverage enhancement level 1, or in a coverage enhancement mode A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In a possible design of the fourth aspect, a bit state 00 of the first field indicates that the resource allocation field is used to indicate the allocated resource block(s); or a bit state 11 of the first field indicates that the resource allocation field is used to indicate the allocated resource block(s).

In a possible design of the fourth aspect,

K=5, M=5, L=5, and the subcarrier resource indicated by the resource allocation field is three subcarriers or six subcarriers;

K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

In a possible design of the fourth aspect, when K=5, M=5, L=5, and the subcarrier resource allocated by using the resource allocation field is three subcarriers, the downlink control information further includes a second field, and the second field indicates the terminal device to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, where Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In a possible design of the fourth aspect, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In a possible design of the fourth aspect,

K=2, M=3, L=4, and the subcarrier resource allocated by using the resource allocation field is three subcarriers or six subcarriers; or K=2, M=3, L=5, the subcarrier resource allocated by using the resource allocation field is three subcarriers or six subcarriers, and the resource allocation field indicates a quantity of resource units.

In a possible design of the fourth aspect, when K=2, M=3, and L=4, the downlink control information further includes a fifth field, a size of the fifth field is 1 bit, and the fifth field indicates the quantity of resource units.

In the fourth aspect of this application, the composition modules of the network device may further perform the steps described in the second aspect and the possible implementations. For details, refer to the descriptions in the second aspect and the possible implementations.

According to a fifth aspect, an embodiment of this application provides a computer-readable storage medium. The computer-readable storage medium stores an instruction; when the instruction is run on a computer, the computer is enabled to perform the method according to the foregoing aspects.

According to a sixth aspect, an embodiment of this application provides a computer program product including an instruction. When the computer program product is run on a computer, the computer is enabled to perform the method according to the foregoing aspects.

According to a seventh aspect, an embodiment of this application provides a communications apparatus. The communications apparatus may include an entity such as a terminal device, a network device, or a chip. The communications apparatus includes a processor and a memory. The memory is configured to store an instruction. The processor is configured to execute the instruction in the memory, to enable the communications apparatus to perform the method according to either the first aspect or the second aspect.

According to an eighth aspect, this application provides a chip system. The chip system includes a processor and is configured to support a network device or a terminal device in implementing functions in the foregoing aspects, for example, sending or processing data and/or information in the foregoing method. In a possible design, the chip system further includes a memory, and the memory is configured to store a program instruction and data that are necessary for the network device or the terminal device. The chip system may include a chip, or may include a chip and another discrete component.

DESCRIPTION OF EMBODIMENTS

Figure 1:
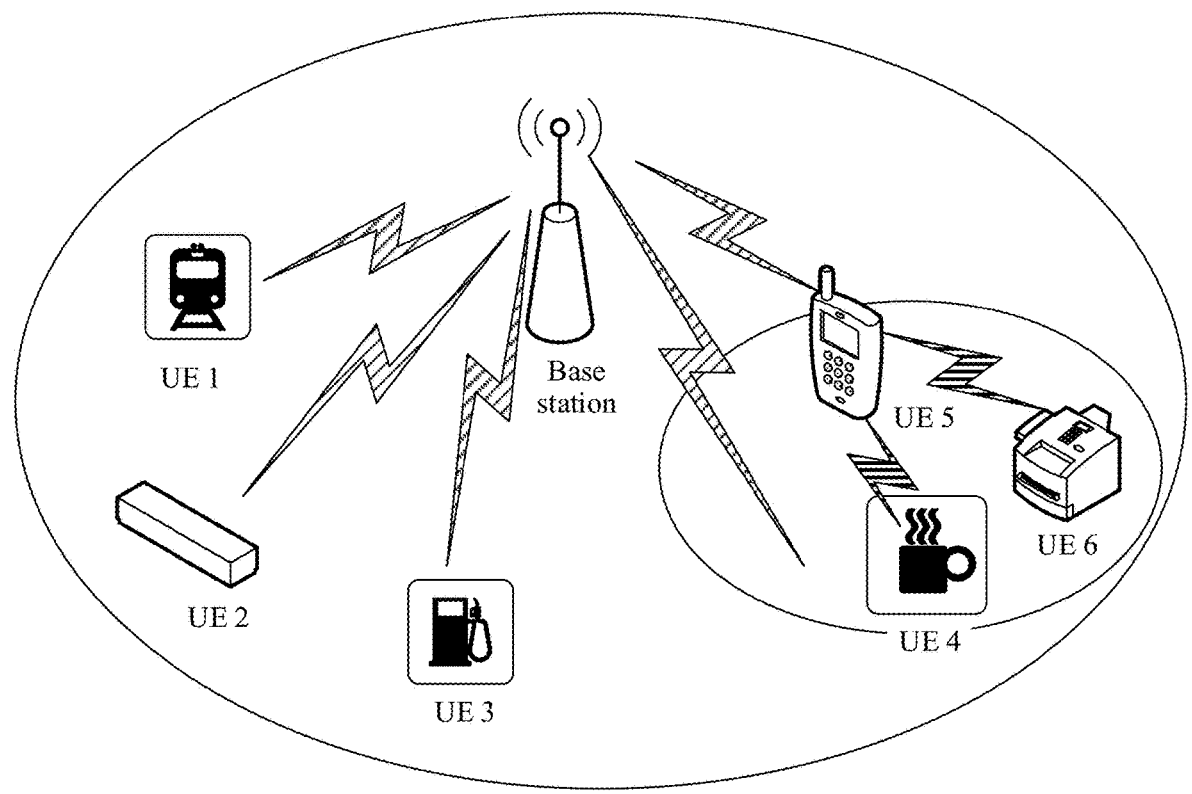
FIG. 1 is a schematic diagram of a system architecture of an information transmission method according to an embodiment of this application.

Embodiments of this application provide an information transmission method and a device, to consider a situation on a network side as much as possible, and avoid a waste of transmission resources.

The following describes the embodiments of this application with reference to the accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Technical solutions in the embodiments of the present invention may be applied to various communications systems for data processing, for example, a code division multiple access (CDMA) system, a time division multiple access (TDMA) system, a frequency division multiple access (FDMA) system, an orthogonal frequency division multiple access (OFDMA) system, and a single carrier frequency division multiple access (SC-FDMA) system, and other systems. The terms "system" and "network" can be interchanged with each other. The CDMA system may implement radio technologies such as universal terrestrial radio access (UTRA) and CDMA2000. UTRA may include a wideband CDMA (WCDMA) technology and another variation technology of CDMA. CDMA2000 may cover the interim standard (IS) 2000 (IS-2000), the IS-95 standard, and the IS-856 standard. A radio technology such as a global system for mobile communications (GSM) may be implemented in the TDMA system. A radio technology such as evolved universal terrestrial radio access (E-UTRA), ultra mobile broadband (UMB), IEEE 802.11 (Wi-Fi), IEEE 802.16 (WiMAX), IEEE 802.20, or Flash OFDMA may be implemented in the OFDMA system. The UTRA is corresponding to UMTS, and the E-UTRA is corresponding to an evolved version of the UMTS. A new version of the UMTS, namely, the E-UTRA, is used in 3GPP long term evolution (LTE) and various versions evolved based on LTE. A 5th generation ("5G" for short) communications system or new radio ("NR" for short) is a next generation communications system under study. In addition, the communications system is further applicable to a future-oriented communications technology which is applicable to the technical solutions provided in the embodiments of the present invention. The system architecture and the service scenario described in the embodiments of the present application are intended to describe the technical solutions more clearly, and do not constitute a limitation on the technical solutions of the present invention. A person of ordinary skill in the art may know that with evolution of the network architecture and emergence of new service scenarios, the technical solutions provided in the embodiments of the present application are also applicable to similar technical problems.

FIG. 1 is a schematic structural diagram of a possible radio access network (RAN for short) according to an embodiment of this application. The RAN may be a base station access system of a 2G network (to be specific, the RAN includes a base station and a base station controller), may be a base station access system of a 3G network (to be specific, the RAN includes a base station and a radio network controller (RNC)), may be a base station access system of a 4G network (to be specific, the RAN includes an eNB and an RNC), or may be a base station access system of a 5G network.

The RAN includes one or more network devices. The network device may be any device with a wireless transceiver function, or a chip disposed in a device with a wireless transceiver function. The network device includes but is not limited to a base station (for example, a base station BS, a NodeB, an evolved NodeB (eNodeB or eNB), a gNodeB (gNB) in a fifth generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (TRPs). The network device may alternatively be a radio controller, a centralized unit (CU), or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminal is connected to a radio access network (RAN) node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1 to 6 each are also referred to as user equipment (UE), a mobile station (MS), a mobile terminal (MT), a terminal, or the like, and is a device that provides voice and/or data connectivity for a user, or is a chip disposed in the device, for example, a handheld device or a vehicle-mounted device with a wireless connection function. Currently, for example, the terminal device is a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

In the embodiments of this application, the base station and the UE 1 to the UE 6 form a communications system. In the communications system, the base station sends one or more of system information, a reauthentication request (Re-Auth-Request (RAR)) message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or more of the UE 4 and the UE 6.

Figure 2:
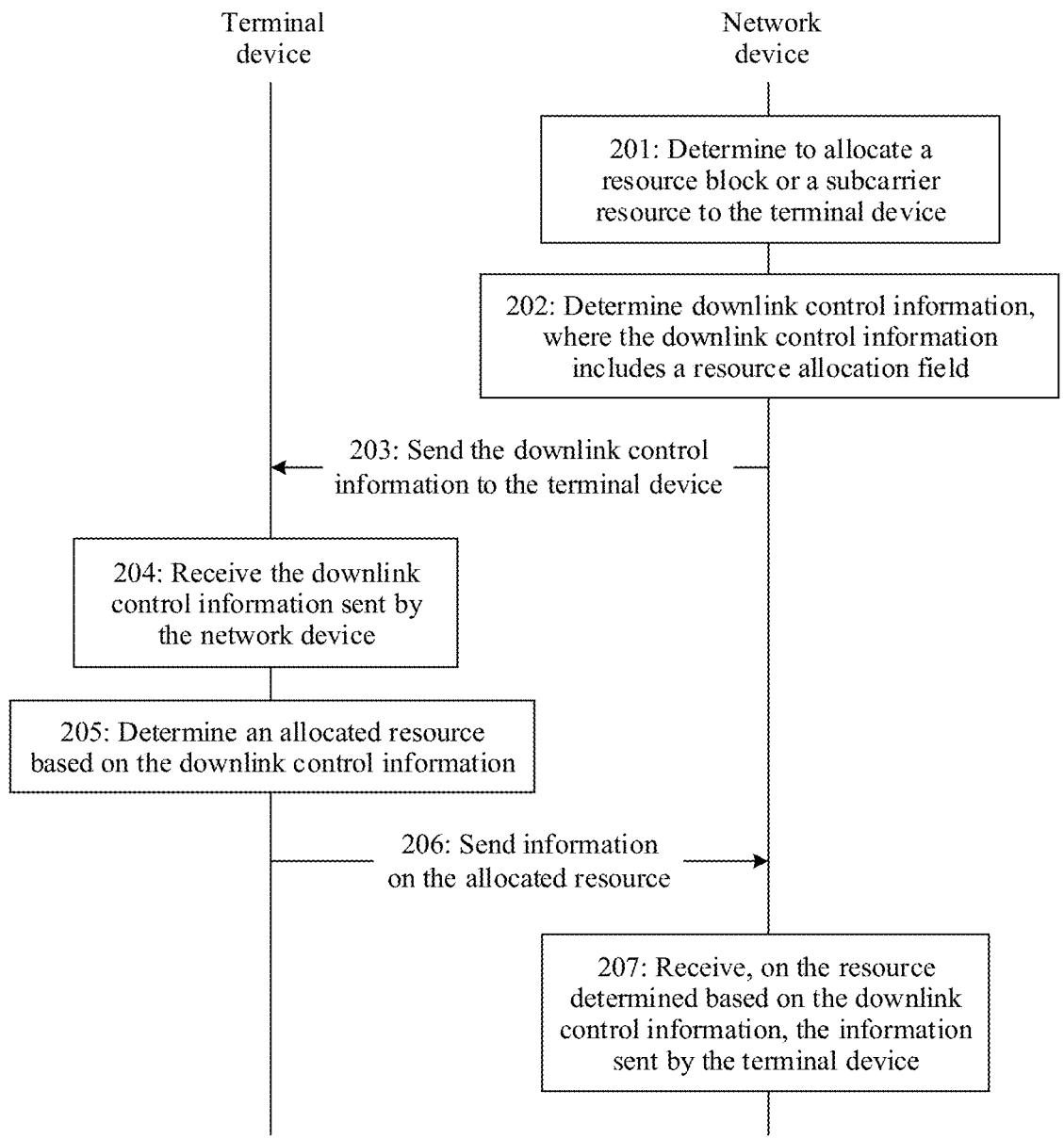
FIG. 2 is a schematic flowchart of interaction between a terminal device and a network device according to an embodiment of this application.

FIG. 2 is a schematic flowchart of interaction between a network device and a terminal device according to an embodiment of this application. An information transmission method provided in this embodiment of this application mainly includes the following steps.

201: The network device determines to allocate resource block(s) or a subcarrier resource to the terminal device.

In this embodiment of this application, when allocating a resource to the terminal device, the network device may allocate the resource block(s), that is, one resource block is used as the minimum unit for resource allocation; or the network device may allocate the subcarrier resource to the terminal device, that is, one subcarrier is used as the minimum unit for resource allocation. For example, the network device may determine, based on current network load, whether the resource block or the subcarrier is used as the unit for resource allocation. For example, in this embodiment of the present invention, when the network device allocates a resource to a physical uplink shared channel (PUSCH) by using a downlink control information (DCI) format 6-0A, the minimum unit may be one resource block, and a resource smaller than 12 subcarriers can also be allocated. Therefore, spectral efficiency of the PUSCH is improved.

202: The network device determines downlink control information, where the downlink control information includes a resource allocation field, and the resource allocation field is used to indicate the allocated resource block(s) or subcarrier resource.

In this embodiment of this application, when the network device allocates the resource to the terminal device, the resource block may be used as the unit, or the subcarrier may be used as the unit. The network device may indicate a specific resource allocation situation by using the resource allocation field included in the downlink control information.

When the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer.

Specifically, $N_{RB}^{UL}$ represents a quantity of uplink physical resource blocks (PRBs) included in a system bandwidth, $\lfloor \ \rfloor$ represents a rounding down operation, and $\lceil \ \rceil$ represents a rounding up operation. When the resource allocation field is used to indicate the allocated resource block(s), the resource allocation field may alternatively include X+

$$\left\lceil \log_2 \left\lfloor \frac{N_{RB}^{UL}}{6} \right\rfloor \right\rceil$$

high-order bits, that is, the X high-order bits are located at the left-most end. In this case, the $$\left\lceil \log_2 \left\lfloor \frac{N_{RB}^{UL}}{6} \right\rfloor \right\rceil$$

low-order bits in the $$X + \left\lceil \log_2 \left\lfloor \frac{N_{RB}^{UL}}{6} \right\rfloor \right\rceil$$

high-order bits indicate the index of the narrowband. The resource allocation field includes M low-order bits, used to indicate resource allocation in the narrowband. The narrowband refers to six non-overlapping consecutive physical resource blocks in frequency domain. A value of M may be 5 or 3, and X may be 0 or a larger integer. Specifically, values of M and X are determined with reference to an application scenario. The quantity of resource blocks indicated by the resource allocation field is greater than or equal to 1, that is, the resource allocation is performed by using the resource block as the unit.

When the resource allocation field is used to indicate the allocated subcarrier resource, the resource allocation field includes the $$\left\lceil \log_2 \left\lfloor \frac{N_{RB}^{UL}}{6} \right\rfloor \right\rceil$$

high-order bits and the L low-order bits, the $$\left\lceil \log_2 \left\lfloor \frac{N_{RB}^{UL}}{6} \right\rfloor \right\rceil$$

high-order bits indicate the index of the narrowband, the L low-order bits indicate the subcarrier resource allocation in the K resource blocks, and the quantity of subcarriers indicated by the resource allocation field is less than 12. Usually, one resource block includes 12 subcarriers. In this embodiment of this application, the quantity of subcarriers indicated by the resource allocation field is less than 12, that is, the resource allocation is performed by using the subcarrier as the unit. Therefore, fewer resources can be allocated. L may be equal to M+X. The L low-order bits indicate the subcarrier resource allocation in the K resource blocks. In this case, the K resource blocks are resource blocks configured by the network device or preset resource blocks. Therefore, the network device may indicate the allocated subcarrier resource to the terminal device by using the L low-order bits.

203: The network device sends the downlink control information to the terminal device.

After the network device determines the downlink control information, the network device may send the downlink control information to the terminal device. The downlink control information includes the resource allocation field, and the resource allocation field indicates the resource block(s) or subcarrier resource allocated to the terminal device.

204: The terminal device receives the downlink control information sent by the network device, where the downlink control information includes the resource allocation field.

The terminal device first receives the downlink control information sent by the network device, and then determines the resource allocation field in the downlink control information.

205: The terminal device determines an allocated resource based on the downlink control information.

206: Send information on the allocated resource.

In this embodiment of the present invention, the terminal device may determine, by using the resource allocation field, that the network device performs resource allocation by using the resource block as the unit, or performs resource allocation by using the subcarrier resource as the unit, and determine the allocated resource based on states of the high-order bits and low-order bits that are included in the resource allocation field. The terminal device may send the uplink information on the resource allocated by the network device.

207: The network device receives, on the resource determined based on the downlink control information, the information sent by the terminal device.

In this embodiment of this application, the network device detects, on the resource allocated to the terminal device, the information sent by the terminal device. The information sent by the terminal device may be sent on the resource block(s) or subcarrier resource allocated by the network device. This specifically depends on a resource configuration situation of the network device.

It can be learned from the example descriptions for this application in the foregoing embodiment that the network device indicates, by using different values of the bit states of the resource allocation field, to allocate the resource block(s) or the subcarrier resource to the terminal device. When the resource allocation field is used to indicate the allocated resource block(s), the resource allocation field includes the $$\left\lceil \log_2 \left\lfloor \frac{N_{RB}^{UL}}{6} \right\rfloor \right\rceil$$

high-order bits and the M+X low-order bits, the $$\left\lceil \log_2 \left\lfloor \frac{N_{RB}^{UL}}{6} \right\rfloor \right\rceil$$

high-order bits indicate the index of the narrowband, the M high-order bits in the M+X low-order bits indicate the resource allocation in the narrowband, and the quantity of resource blocks indicated by the resource allocation field is greater than or equal to 1; or when the resource allocation field is used to indicate the allocated subcarrier resource, the resource allocation field includes the $$\left\lceil \log_2 \left\lfloor \frac{N_{RB}^{UL}}{6} \right\rfloor \right\rceil$$

high-order bits and the L low-order bits, the $$\left\lceil \log_2 \left\lfloor \frac{N_{RB}^{UL}}{6} \right\rfloor \right\rceil$$

high-order bits indicate the index of the narrowband, the L low-order bits indicate the subcarrier resource allocation in the K resource blocks, and the quantity of subcarriers indicated by the resource allocation field is less than 12. In this way, a resource smaller than 12 subcarriers can be allocated, so that effective resources can be allocated to more UEs, and spectral efficiency is improved.

Figure 3:
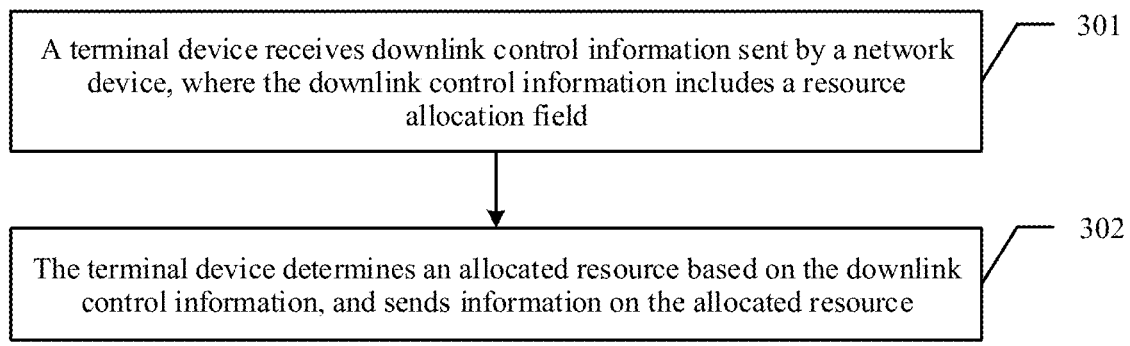
FIG. 3 is a schematic block flowchart of an information transmission method according to an embodiment of this application.

The following describes, from perspectives of a network device and a terminal device, the information processing method provided in the embodiments of this application. First, refer to FIG. 3. An embodiment of this application provides an information transmission method, including the following steps.

301: A terminal device receives downlink control information sent by a network device, where the downlink control information includes a resource allocation field, and the resource allocation field is used to indicate allocated resource block(s) or subcarrier resource.

When the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer.

In some embodiments of this application, the terminal device is at a coverage enhancement level 0 or a coverage enhancement level 1, or in a coverage enhancement mode (Mode) A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

The mode A or a mode B of the terminal device is a classification of coverage enhancement (CE) levels (level) in a connected mode, a CE level 0/1/2/3 is a coverage enhancement level in an idle mode, the mode A corresponds to the CE level 0/1, and the mode B corresponds to the CE level 2/3. When the terminal device is at the coverage enhancement level 0 or the coverage enhancement level 1, or in the coverage enhancement mode A, the downlink control information further includes the first field, the size of the first field is 2 bits, and the first field may have four bit states: The first field has three bit states respectively indicating three different quantities of resource units, and/or the first field has one bit state indicating that the resource allocation field is used to indicate the allocated resource block(s). A quantity of subcarriers occupied by the resource unit (RU) in frequency domain is less than 12, and a resource occupied by the resource unit in time domain is greater than one subframe. The resource unit is used to describe a mapping from a physical uplink shared channel to a resource element. One resource unit is defined as Y consecutive subcarriers in frequency domain and X consecutive orthogonal frequency division multiplexing (OFDM) symbols or single-carrier frequency division multiple access (SC-FDMA) symbols in time domain, where X and Y each are a positive integer. In this embodiment of this application, when the first field has three bit states indicating the quantities of resource units, the resource allocation field indicates the subcarrier resource allocation. In other words, the terminal device may determine, based on a bit state of the resource allocation field, the subcarrier resource allocated by the network device to the terminal device.

Optionally, when the resource allocation field is used to indicate the allocated resource block(s), the resource block(s) is allocated by using an uplink resource allocation type 0.

Further, in some embodiments of this application, a bit state 00 of the first field indicates that the resource allocation field is used to indicate the allocated resource block(s); or a bit state 11 of the first field indicates that the resource allocation field is used to indicate the allocated resource block(s).

The first field indicates the quantity of RUs by using 2 bits. Meanings of the first field are listed in the following Table 1.

TABLE 1

| State of 2 bits | Meaning |
| --- | --- |
| 00 | RB-level resource allocation |
| 01 | A quantity of RUs is 1 |

TABLE 1-continued

| State of 2 bits | Meaning |
| --- | --- |
| 10 | A quantity of RUs is 2 |
| 11 | A quantity of RUs is 4 |

The bit state "00" is used to indicate resource block-level resource allocation, and the bit state "01/11/10" is used to indicate subcarrier-level resource allocation. In addition, the three different bit states of the first field are used to indicate values of the quantities of RUs, and the three different quantities of resource units are 1, 2, and 4.

Optionally, the first field is the $1^{st}$ field in the downlink control information. The terminal device may determine, based on the state indicated by the first field, whether there is another field in the downlink control information or a size of the another field.

In some embodiments of this application, K=5, M=5, L=5, and the subcarrier resource indicated by the resource allocation field is three subcarriers or six subcarriers; K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

Optionally, in some embodiments of this application, the K resource blocks are K resource blocks in the narrowband or K pre-specified resource blocks, and the K pre-specified resource blocks may be K resource blocks in the narrowband or any K resource blocks on the system bandwidth.

Further, in some embodiments of this application, when K=5, M=5, L=5, and the subcarrier resource allocated by using the resource allocation field is three subcarriers, the downlink control information further includes a second field, and the second field indicates the terminal device to transmit information by using the three subcarriers or transmit information by using two consecutive subcarriers in the three subcarriers; when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits information by using two consecutive subcarriers in the three subcarriers, or when the modulation scheme is quadrature phase shift keying (QPSK) modulation, the terminal device transmits information by using the three subcarriers, where Pi/2 represents that a rotation angle is 90 degrees; when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

Specifically, in this embodiment of this application, the downlink control information may further carry the second field or the third field, and the terminal device may further indicate, by using the second field, the terminal device to transmit the information by using the three subcarriers or transmit the information by using the two consecutive subcarriers in the three subcarriers; or the terminal device may determine, by using the third field, the modulation scheme for the information transmission. For example, the modulation scheme may include the Pi/2 BPSK modulation or the QPSK modulation. In this way, the terminal device can transmit the information based on the modulation scheme indicated by the network device.

Optionally, when a quantity of occupied bits in a hybrid automatic repeat request (hybrid ARQ or HARQ) process number field is less than 3, the second field or the third field may occupy an unoccupied bit in the HARQ process number field.

Further, optionally, when K=3, M=5, L=5, and the subcarrier resource allocated by using the resource allocation field is two subcarriers, the subcarrier indexes of the two subcarriers in the resource block to which the two subcarriers belong are {0, 1}+H, {3, 4}+H, {6, 7}+H, or {9, 10}+H, where H is a value determined based on the cell identifier, and the value of H is 0 or 1. For example, when K=5, M=5, L=5, and the resource allocation field includes $$\left\lceil \log_2 \left\lfloor \frac{N_{RB}^{UL}}{6} \right\rfloor \right\rceil + 5 \text{ bits,}$$

the $$\left\lceil \log_2 \left\lfloor \frac{N_{RB}^{UL}}{6} \right\rfloor \right\rceil$$

bit(s) is used to indicate the index of the narrowband in the system bandwidth, the 5 bits are used to indicate that resource allocation in the narrowband corresponding to the index of the narrowband is performed by using the resource block as a unit or by using the subcarrier as a unit.

When the resource allocation field is used for resource allocation performed by using the subcarrier as the unit, the subcarrier resource allocated by the network device is in five resource blocks, and the five resource blocks are resource blocks configured by a higher layer or preset resource blocks for resource allocation performed by using the subcarrier as the unit, may be in the narrowband indicated by the index of the narrowband, or may be any five resource blocks on the system bandwidth. In this case, whether the subcarrier resource allocated by the network device is two subcarriers or three subcarriers is not distinguished. Specifically, a mapping relationship between a state of the 5 low-order bits and the allocated subcarrier resource is listed in the following Table 2, where a resource block n to a resource block n+4 are resource blocks configured by the higher layer or preset resource blocks for resource allocation performed by using the subcarrier as the unit. For another example, when K=3, M=5, L=5, and the resource allocation field includes $$\left\lceil \log_2 \left\lfloor \frac{N_{RB}^{UL}}{6} \right\rfloor \right\rceil + 5 \text{ bits,}$$

the $$\left\lceil \log_2 \left\lfloor \frac{N_{RB}^{UL}}{6} \right\rfloor \right\rceil$$

bit(s) is used to indicate the index of the narrowband in the system bandwidth, the 5 bits are used to indicate that resource allocation in the narrowband corresponding to the index of the narrowband is performed by using the resource block as a unit or by using the subcarrier as a unit.

When the resource allocation field is used for resource allocation performed by using the subcarrier as the unit, the subcarrier resource allocated by the network device is in three resource blocks, and the three resource blocks are resource blocks configured by the higher layer or preset resource blocks for resource allocation performed by using the subcarrier as the unit, may be in the narrowband indicated by the index of the narrowband, or may be any three resource blocks on the system bandwidth. In this case, whether the subcarrier resource allocated by the network device is two subcarriers or three subcarriers is distinguished. A specific mapping relationship between a state of the 5 bits and the allocated subcarrier resource may be listed in the following Table 3, Table 4, Table 5, or Table 6. A resource block n to a resource block n+2 are resource blocks configured by the higher layer or preset resource blocks for resource allocation performed by using the subcarrier as the unit, where n, n+1, and n+2 are indexes of the resource blocks, and are integers.

For another example, when K=6, M=5, L=6, and the resource allocation field is used to indicate resource allocation performed by using the resource block as the unit, the resource allocation field includes $$\left\lceil \log_2 \left\lfloor \frac{N_{RB}^{UL}}{6} \right\rfloor \right\rceil + 5 \text{ bits,}$$

the $$\left\lceil \log_2 \left\lfloor \frac{N_{RB}^{UL}}{6} \right\rfloor \right\rceil$$

high-order bits are used to indicate the index of the narrowband in the system bandwidth, the 5 low-order bits are used to indicate the resource allocation performed by using the resource block as the unit in the narrowband corresponding to the index of the narrowband; or when K=6, M=5, L=6, and the resource allocation field is used to indicate resource allocation performed by using the subcarrier as the unit, the resource allocation field includes $$\left\lceil \log_2 \left\lfloor \frac{N_{RB}^{UL}}{6} \right\rfloor \right\rceil + 6 \text{ bits,}$$

the $$\left\lceil \log_2 \left\lfloor \frac{N_{RB}^{UL}}{6} \right\rfloor \right\rceil$$

high-order bits are used to indicate the index of the narrowband in the system bandwidth, and the 6 low-order bits are used to indicate resource allocation of two subcarriers, three subcarriers, or six subcarriers in six resource blocks, where the six resource blocks are configured by the network device or preset for resource allocation performed by using the subcarrier as the unit, and may be in the narrowband indicated by the index of the narrowband, or may be any six resource blocks on the system bandwidth. When the resource allocation field is used to indicate the resource allocation performed by using the subcarrier as the unit, 60 bit states in 64 bit states indicated by the 6 low-order bits are used to indicate resource allocation of two subcarriers, three subcarriers, or six subcarriers in any resource block (RB) in the narrowband indicated by the index of the narrowband. Specifically, a mapping relationship between a bit state of the 6 low-order bits and the allocated subcarrier resource may be listed in the following Table 7, where a resource block n to a resource block n+5 are resource blocks configured by the network or preset resource blocks for resource allocation performed by using the subcarrier as the unit.

TABLE 2

| State of 5 bits | Allocated resource |
|---|---|
| 00000 | Subcarriers 0, 1, and 2 in a resource block n |
| 00001 | Subcarriers 3, 4, and 5 in the resource block n |
| 00010 | Subcarriers 6, 7, and 8 in the resource block n |
| 00011 | Subcarriers 9, 10, and 11 in the resource block n |
| 00100 | Subcarriers 0, 1, 2, 3, 4, and 5 in the resource block n |
| 00101 | Subcarriers 6, 7, 8, 9, 10, and 11 in the resource block n |
| 00110 | Subcarriers 0, 1, and 2 in a resource block n + 1 |
| 00111 | Subcarriers 3, 4, and 5 in the resource block n + 1 |
| 01000 | Subcarriers 6, 7, and 8 in the resource block n + 1 |
| 01001 | Subcarriers 9, 10, and 11 in the resource block n + 1 |
| 01010 | Subcarriers 0, 1, 2, 3, 4, and 5 in the resource block n + 1 |
| 01011 | Subcarriers 6, 7, 8, 9, 10, and 11 in the resource block n + 1 |
| 01100 | Subcarriers 0, 1, and 2 in the resource block n + 2 |
| 01101 | Subcarriers 3, 4, and 5 in the resource block n + 2 |
| 01110 | Subcarriers 6, 7, and 8 in the resource block n + 2 |
| 01111 | Subcarriers 9, 10, and 11 in the resource block n + 2 |
| 10000 | Subcarriers 0, 1, 2, 3, 4, and 5 in a resource block n + 2 |
| 10001 | Subcarriers 6, 7, 8, 9, 10, and 11 in the resource block n + 2 |
| 10010 | Subcarriers 0, 1, and 2 in a resource block n + 3 |
| 10011 | Subcarriers 3, 4, and 5 in the resource block n + 3 |
| 10100 | Subcarriers 6, 7, and 8 in the resource block n + 3 |
| 10101 | Subcarriers 9, 10, and 11 in the resource block n + 3 |
| 10110 | Subcarriers 0, 1, 2, 3, 4, and 5 in the resource block n + 3 |
| 10111 | Subcarriers 6, 7, 8, 9, 10, and 11 in the resource block n + 3 |
| 11000 | Subcarriers 0, 1, and 2 in a resource block n + 4 |
| 11001 | Subcarriers 3, 4, and 5 in the resource block n + 4 |
| 11010 | Subcarriers 6, 7, and 8 in the resource block n + 4 |
| 11011 | Subcarriers 9, 10, and 11 in the resource block n + 4 |
| 11100 | Subcarriers 0, 1, 2, 3, 4, and 5 in the resource block n + 4 |
| 11101 | Subcarriers 6, 7, 8, 9, 10, and 11 in the resource block n + 4 |
| 11110 | Unused (or used to indicate another function/state) |
| 11111 | Unused (or used to indicate another function/state) |

TABLE 3

| State of 5 bits | Allocated resource |
|---|---|
| 00000 | Subcarriers 0, 1, and 2 in a resource block n (3 subcarriers, QPSK) |
| 00001 | Subcarriers 3, 4, and 5 in the resource block n (3 subcarriers, QPSK) |
| 00010 | Subcarriers 6, 7, and 8 in the resource block n (3 subcarriers, QPSK) |
| 00011 | Subcarriers 9, 10, and 11 in the resource block n (3 subcarriers, QPSK) |
| 00100 | Subcarriers 0, 1, and 2 in the resource block n (2 of 3 subcarriers, pi/2 BSPK) |
| 00101 | Subcarriers 3, 4, and 5 in the resource block n (2 of 3 subcarriers, pi/2 BSPK) |
| 00110 | Subcarriers 6, 7, and 8 in the resource block n (2 of 3 subcarriers, pi/2 BSPK) |
| 00111 | Subcarriers 9, 10, and 11 in the resource block n (2 of 3 subcarriers, pi/2 BSPK) |
| 01000 | Subcarriers 0, 1, 2, 3, 4, and 5 in the resource block n |

TABLE 3-continued

| State of 5 bits | Allocated resource |
|---|---|
| 01001 | Subcarriers 6, 7, 8, 9, 10, and 11 in the resource block n |
| 01010 | Subcarriers 0, 1, and 2 in the resource block n + 1 (3 subcarriers, QPSK) |
| 01011 | Subcarriers 3, 4, and 5 in the resource block n + 1 (3 subcarriers, QPSK) |
| 01100 | Subcarriers 6, 7, and 8 in the resource block n + 1 (3 subcarriers, QPSK) |
| 01101 | Subcarriers 9, 10, and 11 in the resource block n + 1 (3 subcarriers, QPSK) |
| 01110 | Subcarriers 0, 1, and 2 in the resource block n + 1 (2 of 3 subcarriers, pi/2 BSPK) |
| 01111 | Subcarriers 3, 4, and 5 in the resource block n + 1 (2 of 3 subcarriers, pi/2 BSPK) |
| 10000 | Subcarriers 6, 7, and 8 in a resource block n + 1 (2 of 3 subcarriers, pi/2 BSPK) |
| 10001 | Subcarriers 9, 10, and 11 in a resource block n + 1 (2 of 3 subcarriers, pi/2 BSPK) |
| 10010 | Subcarriers 0, 1, 2, 3, 4, and 5 in the resource block n + 1 |
| 10011 | Subcarriers 6, 7, 8, 9, 10, and 11 in the resource block n + 1 |
| 10100 | Subcarriers 0, 1, and 2 in a resource block n + 2 (3 subcarriers, QPSK) |
| 10101 | Subcarriers 3, 4, and 5 in the resource block n + 2 (3 subcarriers, QPSK) |
| 10110 | Subcarriers 6, 7, and 8 in the resource block n + 2 (3 subcarriers, QPSK) |
| 10111 | Subcarriers 9, 10, and 11 in the resource block n + 2 (3 subcarriers, QPSK) |
| 11000 | Subcarriers 0, 1, and 2 in the resource block n + 2 (2 of 3 subcarriers, pi/2 BSPK) |
| 11001 | Subcarriers 3, 4, and 5 in the resource block n + 2 (2 of 3 subcarriers, pi/2 BSPK) |
| 11010 | Subcarriers 6, 7, and 8 in the resource block n + 2 (2 of 3 subcarriers, pi/2 BSPK) |
| 11011 | Subcarriers 9, 10, and 11 in the resource block n + 2 (2 of 3 subcarriers, pi/2 BSPK) |
| 11100 | Subcarriers 0, 1, 2, 3, 4, and 5 in the resource block n + 2 |
| 11101 | Subcarriers 6, 7, 8, 9, 10, and 11 in the resource block n + 2 |
| 11110 | Unused (or used to indicate another function/state) |
| 11111 | Unused (or used to indicate another function/state) |

TABLE 4

| State of 5 bits | Allocated resource |
|---|---|
| 00000 | Subcarriers 0, 1, and 2 in a resource block n (2 of 3 subcarriers, pi/2 BSPK) |
| 00001 | Subcarriers 3, 4, and 5 in the resource block n (2 of 3 subcarriers, pi/2 BSPK) |
| 00010 | Subcarriers 6, 7, and 8 in the resource block n (2 of 3 subcarriers, pi/2 BSPK) |
| 00011 | Subcarriers 9, 10, and 11 in the resource block n (2 of 3 subcarriers, pi/2 BSPK) |
| 00100 | Subcarriers 0, 1, and 2 in the resource block n (3 subcarriers, QPSK) |
| 00101 | Subcarriers 3, 4, and 5 in the resource block n (3 subcarriers, QPSK) |
| 00110 | Subcarriers 6, 7, and 8 in the resource block n (3 subcarriers, QPSK) |
| 00111 | Subcarriers 9, 10, and 11 in the resource block n (3 subcarriers, QPSK) |
| 01000 | Subcarriers 0, 1, 2, 3, 4, and 5 in the resource block n |
| 01001 | Subcarriers 6, 7, 8, 9, 10, and 11 in the resource block n |
| 01010 | Subcarriers 0, 1, and 2 in the resource block n + 1 (2 of 3 subcarriers, pi/2 BSPK) |
| 01011 | Subcarriers 3, 4, and 5 in the resource block n + 1 (2 of 3 subcarriers, pi/2 BSPK) |
| 01100 | Subcarriers 6, 7, and 8 in the resource block n + 1 (2 of 3 subcarriers, pi/2 BSPK) |
| 01101 | Subcarriers 9, 10, and 11 in the resource block n + 1 (2 of 3 subcarriers, pi/2 BSPK) |
| 01110 | Subcarriers 0, 1, and 2 in the resource block n + 1 (3 subcarriers, QPSK) |

TABLE 4-continued

| State of 5 bits | Allocated resource |
| --- | --- |
| 01111 | Subcarriers 3, 4, and 5 in the resource block n + 1 (3 subcarriers, QPSK) |
| 10000 | Subcarriers 6, 7, and 8 in a resource block n + 1 (3 subcarriers, QPSK) |
| 10001 | Subcarriers 9, 10, and 11 in the resource block n + 1 (3 subcarriers, QPSK) |
| 10010 | Subcarriers 0, 1, 2, 3, 4, and 5 in the resource block n + 1 |
| 10011 | Subcarriers 6, 7, 8, 9, 10, and 11 in the resource block n + 1 |
| 10100 | Subcarriers 0, 1, and 2 in a resource block n + 2 (2 of 3 subcarriers, pi/2 BSPK) |
| 10101 | Subcarriers 3, 4, and 5 in the resource block n + 2 (2 of 3 subcarriers, pi/2 BSPK) |
| 10110 | Subcarriers 6, 7, and 8 in the resource block n + 2 (2 of 3 subcarriers, pi/2 BSPK) |
| 10111 | Subcarriers 9, 10, and 11 in the resource block n + 2 (2 of 3 subcarriers, pi/2 BSPK) |
| 11000 | Subcarriers 0, 1, and 2 in the resource block n + 2 (3 subcarriers, QPSK) |
| 11001 | Subcarriers 3, 4, and 5 in the resource block n + 2 (3 subcarriers, QPSK) |
| 11010 | Subcarriers 6, 7, and 8 in the resource block n + 2 (3 subcarriers, QPSK) |
| 11011 | Subcarriers 9, 10, and 11 in the resource block n + 2 (3 subcarriers, QPSK) |
| 11100 | Subcarriers 0, 1, 2, 3, 4, and 5 in the resource block n + 2 |
| 11101 | Subcarriers 6, 7, 8, 9, 10, and 11 in the resource block n + 2 |
| 11110 | Unused (or used to indicate another function/state) |
| 11111 | Unused (or used to indicate another function/state) |

TABLE 5

| State of 5 bits | Allocated resource |
| --- | --- |
| 00000 | Subcarriers 0, 1, and 2 in a resource block n (3 subcarriers, QPSK) |
| 00001 | Subcarriers 3, 4, and 5 in the resource block n (3 subcarriers, QPSK) |
| 00010 | Subcarriers 6, 7, and 8 in the resource block n (3 subcarriers, QPSK) |
| 00011 | Subcarriers 9, 10, and 11 in the resource block n (3 subcarriers, QPSK) |
| 00100 | Subcarriers {0, 1} + H in the resource block n (2 of 3 subcarriers, pi/2 BSPK) |
| 00101 | Subcarriers {3, 4} + H in the resource block n (2 of 3 subcarriers, pi/2 BSPK) |
| 00110 | Subcarriers {6, 7} + H in the resource block n (2 of 3 subcarriers, pi/2 BSPK) |
| 00111 | Subcarriers {9, 10} + H in the resource block n (2 of 3 subcarriers, pi/2 BSPK) |
| 01000 | Subcarriers 0, 1, 2, 3, 4, and 5 in the resource block n |
| 01001 | Subcarriers 6, 7, 8, 9, 10, and 11 in the resource block n |
| 01010 | Subcarriers 0, 1, and 2 in the resource block n + 1 (3 subcarriers, QPSK) |
| 01011 | Subcarriers 3, 4, and 5 in the resource block n + 1 (3 subcarriers, QPSK) |
| 01100 | Subcarriers 6, 7, and 8 in the resource block n + 1 (3 subcarriers, QPSK) |
| 01101 | Subcarriers 9, 10, and 11 in the resource block n + 1 (3 subcarriers, QPSK) |
| 01110 | Subcarriers {0, 1} + H in the resource block n + 1 (2 of 3 subcarriers, pi/2 BSPK) |
| 01111 | Subcarriers {3, 4} + H in the resource block n + 1 (2 of 3 subcarriers, pi/2 BSPK) |
| 10000 | Subcarriers {6, 7} + H in a resource block n + 1 (2 of 3 subcarriers, pi/2 BSPK) |
| 10001 | Subcarriers {9, 10} + H in the resource block n + 1 (2 of 3 subcarriers, pi/2 BSPK) |
| 10010 | Subcarriers 0, 1, 2, 3, 4, and 5 in the resource block n + 1 |
| 10011 | Subcarriers 6, 7, 8, 9, 10, and 11 in the resource block n + 1 |
| 10100 | Subcarriers 0, 1, and 2 in a resource block n + 2 (3 subcarriers, QPSK) |
| 10101 | Subcarriers 3, 4, and 5 in the resource block n + 2 (3 subcarriers, QPSK) |
| 10110 | Subcarriers 6, 7, and 8 in the resource block n + 2 (3 subcarriers, QPSK) |
| 10111 | Subcarriers 9, 10, and 11 in the resource block n + 2 (3 subcarriers, QPSK) |
| 11000 | Subcarriers {0, 1} + H in the resource block n + 2 (2 of 3 subcarriers, pi/2 BSPK) |
| 11001 | Subcarriers {3, 4} + H in the resource block n + 2 (2 of 3 subcarriers, pi/2 BSPK) |
| 11010 | Subcarriers {6, 7} + H in the resource block n + 2 (2 of 3 subcarriers, pi/2 BSPK) |
| 11011 | Subcarriers {9, 10} + H in the resource block n + 2 (2 of 3 subcarriers, pi/2 BSPK) |
| 11100 | Subcarriers 0, 1, 2, 3, 4, and 5 in the resource block n + 2 |
| 11101 | Subcarriers 6, 7, 8, 9, 10, and 11 in the resource block n + 2 |
| 11110 | Unused (or used to indicate another function/state) |
| 11111 | Unused (or used to indicate another function/state) |

TABLE 6

| State of 5 bits | Allocated resource |
| --- | --- |
| 00000 | Subcarriers {0, 1} + H in a resource block n (2 of 3 subcarriers, pi/2 BSPK) |
| 00001 | Subcarriers {3, 4} + H in the resource block n (2 of 3 subcarriers, pi/2 BSPK) |
| 00010 | Subcarriers {6, 7} + H in the resource block n (2 of 3 subcarriers, pi/2 BSPK) |
| 00011 | Subcarriers {9, 10} + H in the resource block n (2 of 3 subcarriers, pi/2 BSPK) |
| 00100 | Subcarriers 0, 1, and 2 in the resource block n (3 subcarriers, QPSK) |
| 00101 | Subcarriers 3, 4, and 5 in the resource block n (3 subcarriers, QPSK) |
| 00110 | Subcarriers 6, 7, and 8 in the resource block n (3 subcarriers, QPSK) |
| 00111 | Subcarriers 9, 10, and 11 in the resource block n (3 subcarriers, QPSK) |
| 01000 | Subcarriers 0, 1, 2, 3, 4, and 5 in the resource block n |
| 01001 | Subcarriers 6, 7, 8, 9, 10, and 11 in the resource block n |
| 01010 | Subcarriers {0, 1} + H in the resource block n + 1 (2 of 3 subcarriers, pi/2 BSPK) |
| 01011 | Subcarriers {3, 4} + H in the resource block n + 1 (2 of 3 subcarriers, pi/2 BSPK) |
| 01100 | Subcarriers {6, 7} + H in the resource block n + 1 (2 of 3 subcarriers, pi/2 BSPK) |
| 01101 | Subcarriers {9, 10} + H in the resource block n + 1 (2 of 3 subcarriers, pi/2 BSPK) |
| 01110 | Subcarriers 0, 1, and 2 in the resource block n + 1 (3 subcarriers, QPSK) |
| 01111 | Subcarriers 3, 4, and 5 in the resource block n + 1 (3 subcarriers, QPSK) |
| 10000 | Subcarriers 6, 7, and 8 in a resource block n + 1 (3 subcarriers, QPSK) |
| 10001 | Subcarriers 9, 10, and 11 in the resource block n + 1 (3 subcarriers, QPSK) |
| 10010 | Subcarriers 0, 1, 2, 3, 4, and 5 in the resource block n + 1 |
| 10011 | Subcarriers 6, 7, 8, 9, 10, and 11 in the resource block n + 1 |
| 10100 | Subcarriers {0, 1} + H in a resource block n + 2 (2 of 3 subcarriers, pi/2 BSPK) |
| 10101 | Subcarriers {3, 4} + H in the resource block n + 2 (2 of 3 subcarriers, pi/2 BSPK) |
| 10110 | Subcarriers {6, 7} + H in the resource block n + 2 (2 of 3 subcarriers, pi/2 BSPK) |
| 10111 | Subcarriers {9, 10} + H in the resource block n + 2 (2 of 3 subcarriers, pi/2 BSPK) |
| 11000 | Subcarriers 0, 1, and 2 in the resource block n + 2 (3 subcarriers, QPSK) |
| 11001 | Subcarriers 3, 4, and 5 in the resource block n + 2 (3 subcarriers, QPSK) |
| 11010 | Subcarriers 6, 7, and 8 in the resource block n + 2 (3 subcarriers, QPSK) |
| 11011 | Subcarriers 9, 10, and 11 in the resource block n + 2 (3 subcarriers, QPSK) |

TABLE 6-continued

| State of 5 bits | Allocated resource |
|---|---|
| 11100 | Subcarriers 0, 1, 2, 3, 4, and 5 in the resource block n + 2 |
| 11101 | Subcarriers 6, 7, 8, 9, 10, and 11 in the resource block n + 2 |
| 11110 | Unused (or used to indicate another function/state) |
| 11111 | Unused (or used to indicate another function/state) |

TABLE 7

| State of 6 bits | Allocated resource |
|---|---|
| 000000 | Subcarriers {0, 1} + H in a resource block n |
| 000001 | Subcarriers {3, 4} + H in the resource block n |
| 000010 | Subcarriers {6, 7} + H in the resource block n |
| 000011 | Subcarriers {9, 10} + H in the resource block n |
| 000100 | Subcarriers 0, 1, and 2 in the resource block n |
| 000101 | Subcarriers 3, 4, and 5 in the resource block n |
| 000110 | Subcarriers 6, 7, and 8 in the resource block n |
| 000111 | Subcarriers 9, 10, and 11 in the resource block n |
| 001000 | Subcarriers 0, 1, 2, 3, 4, and 5 in the resource block n |
| 001001 | Subcarriers 6, 7, 8, 9, 10, and 11 in the resource block n |
| 001010 | Subcarriers {0, 1} + H in a resource block n + 1 |
| 001011 | Subcarriers {3, 4} + H in the resource block n + 1 |
| 001100 | Subcarriers {6, 7} + H in the resource block n + 1 |
| 001101 | Subcarriers {9, 10} + H in the resource block n + 1 |
| 001110 | Subcarriers 0, 1, and 2 in the resource block n + 1 |
| 001111 | Subcarriers 3, 4, and 5 in the resource block n + 1 |
| 010000 | Subcarriers 6, 7, and 8 in the resource block n + 1 |
| 010001 | Subcarriers 9, 10, and 11 in the resource block n + 1 |
| 010010 | Subcarriers 0, 1, 2, 3, 4, and 5 in the resource block n + 1 |
| 010011 | Subcarriers 6, 7, 8, 9, 10, and 11 in the resource block n + 1 |
| 010100 | Subcarriers {0, 1} + H in a resource block n + 2 |
| 010101 | Subcarriers {3, 4} + H in the resource block n + 2 |
| 010110 | Subcarriers {6, 7} + H in the resource block n + 2 |
| 010111 | Subcarriers {9, 10} + H in the resource block n + 2 |
| 011000 | Subcarriers 0, 1, and 2 in the resource block n + 2 |
| 011001 | Subcarriers 3, 4, and 5 in the resource block n + 2 |
| 011010 | Subcarriers 6, 7, and 8 in the resource block n + 2 |
| 011011 | Subcarriers 9, 10, and 11 in the resource block n + 2 |
| 011100 | Subcarriers 0, 1, 2, 3, 4, and 5 in the resource block n + 2 |
| 011101 | Subcarriers 6, 7, 8, 9, 10, and 11 in the resource block n + 2 |
| 011110 | Subcarriers {0, 1} + H in the resource block n + 3 |
| 011111 | Subcarriers {3, 4} + H in the resource block n + 3 |
| 100000 | Subcarriers {6, 7} + H in a resource block n + 3 |
| 100001 | Subcarriers {9, 10} + H in the resource block n + 3 |
| 100010 | Subcarriers 0, 1, and 2 in the resource block n + 3 |
| 100011 | Subcarriers 3, 4, and 5 in the resource block n + 3 |
| 100100 | Subcarriers 6, 7, and 8 in the resource block n + 3 |
| 100101 | Subcarriers 9, 10, and 11 in the resource block n + 3 |
| 100110 | Subcarriers 0, 1, 2, 3, 4, and 5 in the resource block n + 3 |
| 100111 | Subcarriers 6, 7, 8, 9, 10, and 11 in the resource block n + 3 |
| 101000 | Subcarriers {0, 1} + H in a resource block n + 4 |
| 101001 | Subcarriers {3, 4} + H in the resource block n + 4 |
| 101010 | Subcarriers {6, 7} + H in the resource block n + 4 |
| 101011 | Subcarriers {9, 10} + H in the resource block n + 4 |
| 101100 | Subcarriers 0, 1, and 2 in the resource block n + 4 |
| 101101 | Subcarriers 3, 4, and 5 in the resource block n + 4 |
| 101110 | Subcarriers 6, 7, and 8 in the resource block n + 4 |
| 101111 | Subcarriers 9, 10, and 11 in the resource block n + 4 |
| 110000 | Subcarriers 0, 1, 2, 3, 4, and 5 in the resource block n + 4 |
| 110001 | Subcarriers 6, 7, 8, 9, 10, and 11 in the resource block n + 4 |
| 110010 | Subcarriers {0, 1} + H in a resource block n + 5 |
| 110011 | Subcarriers {3, 4} + H in the resource block n + 5 |
| 110100 | Subcarriers {6, 7} + H in the resource block n + 5 |
| 110101 | Subcarriers {9, 10} + H in the resource block n + 5 |
| 110110 | Subcarriers 0, 1, and 2 in the resource block n + 5 |
| 110111 | Subcarriers 3, 4, and 5 in the resource block n + 5 |
| 111000 | Subcarriers 6, 7, and 8 in the resource block n + 5 |
| 111001 | Subcarriers 9, 10, and 11 in the resource block n + 5 |
| 111010 | Subcarriers 0, 1, 2, 3, 4, and 5 in the resource block n + 5 |
| 111011 | Subcarriers 6, 7, 8, 9, 10, and 11 in the resource block n + 5 |
| 111100 | Unused |
| 111101 | Unused |
| 111110 | Unused |
| 111111 | Unused |

In this embodiment of this application, 2 bits may be added to the downlink control information, to support the resource allocation performed by using the resource block as the unit or performed by using the subcarrier as the unit, and support indication of the quantity of resource units.

Optionally, in some embodiments of this application, when the downlink control information is used for resource block allocation, a size of a sixth field in the downlink control information is N bits; or when the downlink control information is used for subcarrier resource allocation, a size of a sixth field in the downlink control information is N−1 bits. N is a positive integer greater than or equal to 1. In this application, if N is equal to 1, when the downlink control information is used for subcarrier resource allocation, the size of the sixth field in the downlink control information is 0 bits, and it indicates that the downlink control information does not include the sixth field.

The sixth field may be a flag format 6-0A/format 6-1A differentiation field, a modulation and coding scheme field, a HARQ process number field, or a repetition number field.

For example, when the downlink control information is used for resource block allocation, the flag format 6-0A/format 6-1A differentiation field is 1 bit; or when the downlink control information is used for subcarrier resource allocation, the downlink control information does not include the flag format 6-0A/format 6-1A differentiation field.

For another example, when the downlink control information is used for resource block allocation, a size of the modulation and coding scheme field is 4 bits; or when the downlink control information is used for subcarrier resource allocation, a size of the modulation and coding scheme field is 3 bits.

For another example, when the downlink control information is used for resource block allocation, a size of the HARQ process number field is 3 bits; or when the downlink control information is used for subcarrier resource allocation, a size of the HARQ process number field is 2 bits.

For another example, when the downlink control information is used for resource block allocation, a size of the repetition number field is 2 bits; or when the downlink control information is used for subcarrier resource allocation, a size of the repetition number field is 1 bit.

Optionally, based on the foregoing implementation, when the downlink control information is used for resource block allocation, a size of a seventh field in the downlink control information is P bits; or when the downlink control information is used for subcarrier resource allocation, a size of a seventh field in the downlink control information is P−1 bits. P is a positive integer greater than or equal to 1. The seventh field is a field different from the sixth field. For example, the seventh field is the flag format 6-0A/format 6-1A differentiation field, the modulation and coding scheme field, the HARQ process number field, or the repetition number field.

For example, the sixth field is the flag format 6-0A/format 6-1A differentiation field, and the seventh field is the modulation and coding scheme field.

For another example, the sixth field is the flag format 6-0A/format 6-1A differentiation field, and the seventh field is the HARQ process number field.

For another example, the sixth field is the flag format 6-0A/format 6-1A differentiation field, and the seventh field is the repetition number field.

For another example, the sixth field is the modulation and coding scheme field, and the seventh field is the HARQ process number field.

For another example, the sixth field is the modulation and coding scheme field, and the seventh field is the repetition number field.

For another example, the sixth field is the repetition number field, and the seventh field is the HARQ process number field.

For another example, when the downlink control information is used for resource block allocation, the size of the sixth field is 1 bit, the size of the seventh field is 4 bits; or when the downlink control information is used for subcarrier resource allocation, the downlink control information does not include the sixth field, and the size of the seventh field is 3 bits.

Further, optionally, in some embodiments of this application, when the downlink control information is used for resource block allocation, the downlink control information includes a narrowband resource adjustment field; or when the downlink control information is used for subcarrier resource allocation, the downlink control information does not include a narrowband resource adjustment field. Alternatively, when the downlink control information is used for resource block allocation, the downlink control information does not include a narrowband resource adjustment field; or when the downlink control information is used for subcarrier resource allocation, the downlink control information includes a narrowband resource adjustment field. The narrowband resource adjustment field is a field used to indicate whether a narrowband is offset, a narrowband offset direction, or a narrowband offset magnitude.

Optionally, in some embodiments of this application, when the downlink control information is used for resource block allocation, the downlink control information includes a field indicating the index of the narrowband; or when the downlink control information is used for subcarrier resource allocation, the downlink control information does not include a field indicating the index of the narrowband.

In some embodiments of this application, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

The terminal device may determine, based on a value of the bit state of the fourth field, whether the resource allocation field is used to indicate the allocated resource block(s) or the allocated subcarrier resource.

Further, in some embodiments of this application, K=2, M=3, L=4, and the subcarrier resource allocated by using the resource allocation field is three subcarriers or six subcarriers; K=2, M=3, L=5, the subcarrier resource allocated by using the resource allocation field is three subcarriers or six subcarriers, and the resource allocation field indicates a quantity of resource units; or K=3, M=3, L=5, and the subcarrier resource allocated by using the resource allocation field is two subcarriers, three subcarriers, or six subcarriers.

For example, when K=2, M=3, L=4, and the resource allocation field is used to indicate the allocated resource block(s), the terminal device may determine that the resource block(s) allocated by using the resource allocation field is one or two resource blocks in the narrowband corresponding to the index, of the narrowband, that is indicated by the $$\left\lceil \log_2 \left\lfloor \frac{N_{RB}^{UL}}{6} \right\rfloor \right\rceil$$

high-order bits; or when K=2, M=3, L=4, and the resource allocation field is used to indicate the allocated subcarrier resource, the terminal device may determine that the subcarrier resource allocated by using the resource allocation field is three subcarriers or six subcarriers in two resource blocks. When K=2, M=3, L=5, and the resource allocation field is used to indicate the allocated resource block(s), the terminal device may determine that the resource block(s) allocated by using the resource allocation field is one or two resource blocks in the narrowband corresponding to the index, of the narrowband, that is indicated by the $$\left\lceil \log_2 \left\lfloor \frac{N_{RB}^{UL}}{6} \right\rfloor \right\rceil$$

high-order bits; or when K=2, M=3, L=5, and the resource allocation field is used to indicate the allocated subcarrier resource, the terminal device may determine that the subcarrier resource allocated by using the resource allocation field is three subcarriers or six subcarriers in two resource blocks, and the resource allocation field can indicate two quantities of resource units.

Further, optionally, when the resource allocation field is used to indicate the allocated resource block(s), an uplink resource allocation type 2 is used.

Further, optionally, when the resource allocation field is used to indicate the allocated subcarrier resource, the two resource blocks are resource blocks configured by the network or preset resource blocks.

Further, optionally, the two resource blocks may be in the narrowband corresponding to the index, of the narrowband, that is indicated by the $$\left\lceil \log_2 \left\lfloor \frac{N_{RB}^{UL}}{6} \right\rfloor \right\rceil$$

high-order bits, or may be any two resource blocks on the system bandwidth.

Further, in some embodiments of this application, when K=2, M=3, and L=4, or when K=3, M=3, and L=5, the downlink control information further includes a fifth field, and the terminal device may determine, based on a bit state of the fifth field, the quantity of resource units indicated by the network device. A size of the fifth field is 1 bit, the fifth field indicates the quantity of resource units, and two states corresponding to the 1 bit indicate two quantities of resource units.

Further, optionally, the two quantities of resource units may be 1 and 2.

Further, optionally, the two quantities of resource units may be 2 and 4.

Optionally, the fourth field is the 1st field in the downlink control information, and the terminal device may determine, based on a state indicated by the fourth field, whether there is another field in the downlink control information or a size of the another field.

Optionally, in some embodiments of this application, when the downlink control information is used for resource block allocation, a size of an eighth field in the downlink control information is S bits; or when the downlink control information is used for subcarrier resource allocation, a size of an eighth field in the downlink control information is S−1 bits. S is a positive integer greater than or equal to 1. In this application, if S is equal to 1, when the downlink control information is used for subcarrier resource allocation, the size of the eighth field in the downlink control information is 0 bits, and it indicates that the downlink control information does not include the eighth field.

The eighth field may be a flag format 6-0B/format 6-1B differentiation field, a modulation and coding scheme field, a HARQ process number field, or a repetition number field.

For example, when the bit state of the fourth field indicates that the downlink control information is used for resource block allocation, the flag format 6-0B/format 6-1B differentiation field is 1 bit; or when the bit state of the fourth field indicates that the downlink control information is used for subcarrier resource allocation, the downlink control information does not include the flag format 6-0B/format 6-1B differentiation field.

For another example, when the bit state of the fourth field indicates that the downlink control information is used for resource block allocation, a size of the modulation and coding scheme field is 4 bits; or when the bit state of the fourth field indicates that the downlink control information is used for subcarrier resource allocation, a size of the modulation and coding scheme field is 3 bits.

For another example, when the bit state of the fourth field indicates that the downlink control information is used for resource block allocation, a size of the HARQ process number field is 1 bit; or when the bit state of the fourth field indicates that the downlink control information is used for subcarrier resource allocation, the downlink control information does not include the HARQ process number field.

For another example, when the bit state of the fourth field indicates that the downlink control information is used for resource block allocation, a size of the repetition number field is 3 bits; or when the bit state of the fourth field indicates that the downlink control information is used for subcarrier resource allocation, a size of the repetition number field is 2 bits.

Optionally, based on the foregoing implementation, when the downlink control information is used for resource block allocation, a size of a ninth field in the downlink control information is P bits; or when the downlink control information is used for subcarrier resource allocation, a size of a ninth field in the downlink control information is P−1 bits. P is a positive integer greater than or equal to 1. The ninth field is a field different from the eighth field. For example, the ninth field is the flag format 6-0B/format 6-1B differentiation field, the modulation and coding scheme field, the HARQ process number field, or the repetition number field.

For example, the eighth field is the flag format 6-0B/format 6-1B differentiation field, and the ninth field is the modulation and coding scheme field.

For another example, the eighth field is the flag format 6-0B/format 6-1B differentiation field, and the ninth field is the HARQ process number field.

For another example, the eighth field is the flag format 6-0B/format 6-1B differentiation field, and the ninth field is the repetition number field.

For another example, the eighth field is the modulation and coding scheme field, and the ninth field is the HARQ process number field.

For another example, the eighth field is the modulation and coding scheme field, and the ninth field is the repetition number field.

For another example, the eighth field is the repetition number field, and the ninth field is the HARQ process number field.

Optionally, in some embodiments of this application, when the downlink control information is used for resource block allocation, the downlink control information includes a field indicating the index of the narrowband; or when the downlink control information is used for subcarrier resource allocation, the downlink control information does not include a field indicating the index of the narrowband.

Optionally, in some embodiments of this application, when the downlink control information is used for resource block allocation, the downlink control information includes a narrowband resource adjustment field; or when the downlink control information is used for subcarrier resource allocation, the downlink control information does not include a narrowband resource adjustment field. Alternatively, when the downlink control information is used for resource block allocation, the downlink control information does not include a narrowband resource adjustment field; or when the downlink control information is used for subcarrier resource allocation, the downlink control information includes a narrowband resource adjustment field. The narrowband resource adjustment field is a field used to indicate whether a narrowband is offset, a narrowband offset direction, or a narrowband offset magnitude.

302: The terminal device determines an allocated resource based on the downlink control information, and sends information on the allocated resource.

In this embodiment of the present invention, the network device can indicate, by using the resource allocation field, to perform resource allocation by using the resource block as the unit, or indicate, by using the resource allocation field, to perform resource allocation by using the subcarrier resource as the unit, and determine the allocated resource by using the states of the high-order bits and low-order bits that are included in the resource allocation field. The terminal device may send the uplink information by using the resource allocated by the network device.

It can be learned from the example descriptions for this application in the foregoing embodiment that the network device indicates, by using different values of the bit states of the resource allocation field, to allocate the resource block(s) or the subcarrier resource to the terminal device. When the resource allocation field is used to indicate the allocated resource block(s), the resource allocation field includes the $$\left\lceil \log_2 \left\lfloor \frac{N_{RB}^{UL}}{6} \right\rfloor \right\rceil$$

high-order bits and the M+X low-order bits, the $$\left\lceil \log_2 \left\lfloor \frac{N_{RB}^{UL}}{6} \right\rfloor \right\rceil$$

high-order bits indicate the index of the narrowband, the M high-order bits in the M+X low-order bits indicate the resource allocation in the narrowband, and the quantity of resource blocks indicated by the resource allocation field is greater than or equal to 1; or when the resource allocation field is used to indicate the allocated subcarrier resource, the resource allocation field includes the $$\left\lceil \log_2 \left\lfloor \frac{N_{RB}^{UL}}{6} \right\rfloor \right\rceil$$

high-order bits and the L low-order bits, the $$\left\lceil \log_2 \left\lfloor \frac{N_{RB}^{UL}}{6} \right\rfloor \right\rceil$$

high-order bits indicate the index of the narrowband, the L low-order bits indicate the subcarrier resource allocation in the K resource blocks, and the quantity of subcarriers indicated by the resource allocation field is less than 12. In this way, a resource smaller than 12 subcarriers can be allocated, so that effective resources can be allocated to more UEs, and spectral efficiency is improved.

The following further describes, from a perspective of a terminal device, the information processing method provided in the embodiments of this application. First, refer to FIG. 3. An embodiment of this application provides an information transmission method, including the following steps.

301: A terminal device receives downlink control information sent by a network device, where the downlink control information includes a resource allocation field, and the resource allocation field is used to indicate allocated resource block(s) or subcarrier resource.

When the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes L bits, where the L bits are used to indicate subcarrier resource allocation in K resource blocks; or the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer.

In some embodiments of this application, the terminal device is at a coverage enhancement level 0 or a coverage enhancement level 1, or in a coverage enhancement mode (Mode) A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

The mode A or a mode B of the terminal device is a classification of coverage enhancement (CE) levels (level) in a connected mode, a CE level 0/1/2/3 is a coverage enhancement level in an idle mode, the mode A corresponds to the CE level 0/1, and the mode B corresponds to the CE level 2/3. When the terminal device is at the coverage enhancement level 0 or the coverage enhancement level 1, or in the coverage enhancement mode A, the downlink control information further includes the first field, the size of the first field is 2 bits, and the first field may have four bit states: The first field has three bit states respectively indicating three different quantities of resource units, and/or the first field has one bit state indicating that the resource allocation field is used to indicate the allocated resource block(s). A quantity of subcarriers occupied by the resource unit (RU) in frequency domain is less than 12, and a resource occupied by the resource unit in time domain is greater than one subframe. The resource unit is used to describe a mapping from a physical uplink shared channel to a resource element. One resource unit is defined as Y consecutive subcarriers in frequency domain and X consecutive orthogonal frequency division multiplexing (OFDM) symbols or single-carrier frequency division multiple access (SC-FDMA) symbols in time domain, where X and Y each are a positive integer. In this embodiment of this application, when the first field has three bit states indicating the quantities of resource units, the resource allocation field indicates the subcarrier resource allocation. In other words, the terminal device may determine, based on a bit state of the resource allocation field, the subcarrier resource allocated by the network device to the terminal device.

Optionally, when the resource allocation field is used to indicate the allocated resource block(s), the resource block(s) is allocated by using an uplink resource allocation type 0.

Further, in some embodiments of this application, a bit state 00 of the first field indicates that the resource allocation field is used to indicate the allocated resource block(s); or a bit state 11 of the first field indicates that the resource allocation field is used to indicate the allocated resource block(s).

The first field indicates the quantity of RUs by using 2 bits. Meanings of the first field are listed in the following Table 1.

TABLE 1

| State of 2 bits | Meaning |
| --- | --- |
| 00 | RB-level resource allocation |
| 01 | A quantity of RUs is 1 |
| 10 | A quantity of RUs is 2 |
| 11 | A quantity of RUs is 4 |

The bit state "00" is used to indicate resource block-level resource allocation, and the bit state "01/11/10" is used to indicate subcarrier-level resource allocation. In addition, the three different bit states of the first field are used to indicate values of the quantities of RUs, and the three different quantities of resource units are 1, 2, and 4.

Optionally, the first field is the 1st field in the downlink control information. The terminal device may determine, based on the state indicated by the first field, whether there is another field in the downlink control information or a size of the another field.

Optionally, in some embodiments of this application, when the downlink control information is used for resource block allocation, a size of a sixth field in the downlink control information is N bits; or when the downlink control information is used for subcarrier resource allocation, a size of a sixth field in the downlink control information is N−1 bits. N is a positive integer greater than or equal to 1. In this application, if N is equal to 1, when the downlink control information is used for subcarrier resource allocation, the size of the sixth field in the downlink control information is 0 bits, and it indicates that the downlink control information does not include the sixth field.

The sixth field may be a flag format 6-0A/format 6-1A differentiation field, a modulation and coding scheme field, a HARQ process number field, or a repetition number field.

For example, when the bit state of the first field indicates that the downlink control information is used for resource block allocation, the flag format 6-0A/format 6-1A differentiation field is 1 bit; or when the bit state of the first field indicates that the downlink control information is used for subcarrier resource allocation, the downlink control information does not include the flag format 6-0A/format 6-1A differentiation field.

For another example, when the bit state of the first field indicates that the downlink control information is used for resource block allocation, a size of the modulation and coding scheme field is 4 bits; or when the bit state of the first field indicates that the downlink control information is used for subcarrier resource allocation, a size of the modulation and coding scheme field is 3 bits.

For another example, when the bit state of the first field indicates that the downlink control information is used for resource block allocation, a size of the HARQ process number field is 3 bits; or when the bit state of the first field indicates that the downlink control information is used for subcarrier resource allocation, a size of the HARQ process number field is 2 bits.

For another example, when the bit state of the first field indicates that the downlink control information is used for resource block allocation, a size of the repetition number field is 2 bits; or when the bit state of the first field indicates that the downlink control information is used for subcarrier resource allocation, a size of the repetition number field is 1 bit.

Optionally, based on the foregoing implementation, when the downlink control information is used for resource block allocation, a size of a seventh field in the downlink control information is P bits; or when the downlink control information is used for subcarrier resource allocation, a size of a seventh field in the downlink control information is P−1 bits. P is a positive integer greater than or equal to 1. The seventh field is a field different from the sixth field. For example, the seventh field is the flag format 6-0A/format 6-1A differentiation field, the modulation and coding scheme field, the HARQ process number field, or the repetition number field.

For example, the sixth field is the flag format 6-0A/format 6-1A differentiation field, and the seventh field is the modulation and coding scheme field.

For another example, the sixth field is the flag format 6-0A/format 6-1A differentiation field, and the seventh field is the HARQ process number field.

For another example, the sixth field is the flag format 6-0A/format 6-1A differentiation field, and the seventh field is the repetition number field.

For another example, the sixth field is the modulation and coding scheme field, and the seventh field is the HARQ process number field.

For another example, the sixth field is the modulation and coding scheme field, and the seventh field is the repetition number field.

For another example, the sixth field is the repetition number field, and the seventh field is the HARQ process number field.

Optionally, in some embodiments of this application, when the downlink control information is used for resource block allocation, the downlink control information includes a field indicating the index of the narrowband; or when the downlink control information is used for subcarrier resource allocation, the downlink control information does not include a field indicating the index of the narrowband.

Optionally, in some embodiments of this application, when the downlink control information is used for resource block allocation, the downlink control information includes a narrowband resource adjustment field; or when the downlink control information is used for subcarrier resource allocation, the downlink control information does not include a narrowband resource adjustment field. Alternatively, when the downlink control information is used for resource block allocation, the downlink control information does not include a narrowband resource adjustment field; or when the downlink control information is used for subcarrier resource allocation, the downlink control information includes a narrowband resource adjustment field. The narrowband resource adjustment field is a field used to indicate whether a narrowband is offset, a narrowband offset direction, or a narrowband offset magnitude.

In some embodiments of this application, K=6, M=5, L=6, and the subcarrier resource indicated by the resource allocation field is two subcarriers, three subcarriers, or six subcarriers. Further, optionally, in some embodiments of this application, the K resource blocks are K resource blocks in the narrowband or K pre-specified resource blocks, and the K pre-specified resource blocks may be K resource blocks in the narrowband or any K resource blocks on the system bandwidth.

Further, in some embodiments of this application, when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

When K=6, M=5, L=6, and the resource allocation field is used to indicate resource allocation performed by using the resource block as the unit, the resource allocation field includes $$\left\lceil \log_2 \left\lfloor \frac{N_{RB}^{UL}}{6} \right\rfloor \right\rceil + 5 \text{ bits,}$$

the $$\left\lceil \log_2 \left\lfloor \frac{N_{RB}^{UL}}{6} \right\rfloor \right\rceil$$

high-order bits are used to indicate the index of the narrowband in the system bandwidth, and the 5 low-order bits are used to indicate resource allocation performed by using the resource block as the unit in the narrowband corresponding to the index of the narrowband. When the resource allocation field is used to indicate resource allocation performed by using the subcarrier as the unit, the resource allocation field includes $$\left\lceil \log_2 \left\lfloor \frac{N_{RB}^{UL}}{6} \right\rfloor \right\rceil + 6 \text{ bits,}$$

the $$\left\lceil \log_2 \left\lfloor \frac{N_{RB}^{UL}}{6} \right\rfloor \right\rceil$$

high-order bits are used to indicate the index of the narrowband in the system bandwidth, and the 6 low-order bits are used to indicate resource allocation of two subcarriers, three subcarriers, or six subcarriers in six resource blocks in the narrowband corresponding to the index of the narrowband; or when the resource allocation field is used to indicate resource allocation performed by using the subcarrier as the unit, the resource allocation field includes 6 bits, and is used to indicate resource allocation of two subcarriers, three subcarriers, or six subcarriers in six resource blocks configured by a network or six predefined resource blocks.

In some embodiments of this application, the terminal device is at a coverage enhancement level 2 or a coverage enhancement level 3, or in a coverage enhancement mode B; the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

The terminal device may determine, based on a value of the bit state of the fourth field, whether the resource allocation field is used to indicate the allocated resource block(s) or the allocated subcarrier resource.

Optionally, the fourth field is the 1st field in the downlink control information. The terminal device may determine, based on a state indicated by the fourth field, whether there is another field in the downlink control information or a size of the another field.

Optionally, in some embodiments of this application, when the downlink control information is used for resource block allocation, a size of an eighth field in the downlink control information is S bits; or when the downlink control information is used for subcarrier resource allocation, a size of an eighth field in the downlink control information is S−1 bits. S is a positive integer greater than or equal to 1. In this application, if S is equal to 1, when the downlink control information is used for subcarrier resource allocation, the size of the eighth field in the downlink control information is 0 bits, and it indicates that the downlink control information does not include the eighth field.

The eighth field may be a flag format 6-0B/format 6-1B differentiation field, a modulation and coding scheme field, a HARQ process number field, or a repetition number field.

For example, when the bit state of the fourth field indicates that the downlink control information is used for resource block allocation, the flag format 6-0B/format 6-1B differentiation field is 1 bit; or when the bit state of the fourth field indicates that the downlink control information is used for subcarrier resource allocation, the downlink control information does not include the flag format 6-0B/format 6-1B differentiation field.

For another example, when the bit state of the fourth field indicates that the downlink control information is used for resource block allocation, a size of the modulation and coding scheme field is 4 bits; or when the bit state of the fourth field indicates that the downlink control information is used for subcarrier resource allocation, a size of the modulation and coding scheme field is 3 bits.

For another example, when the bit state of the fourth field indicates that the downlink control information is used for resource block allocation, a size of the HARQ process number field is 1 bit; or when the bit state of the fourth field indicates that the downlink control information is used for subcarrier resource allocation, the downlink control information does not include the HARQ process number field.

For another example, when the bit state of the fourth field indicates that the downlink control information is used for resource block allocation, a size of the repetition number field is 3 bits; or when the bit state of the fourth field indicates that the downlink control information is used for subcarrier resource allocation, a size of the repetition number field is 2 bits.

Optionally, based on the foregoing implementation, when the downlink control information is used for resource block allocation, a size of a ninth field in the downlink control information is P bits; or when the downlink control information is used for subcarrier resource allocation, a size of a ninth field in the downlink control information is P−1 bits. P is a positive integer greater than or equal to 1. The ninth field is a field different from the eighth field. For example, the ninth field is the flag format 6-0B/format 6-1B differentiation field, the modulation and coding scheme field, the HARQ process number field, or the repetition number field.

For example, the eighth field is the flag format 6-0B/format 6-1B differentiation field, and the ninth field is the modulation and coding scheme field.

For another example, the eighth field is the flag format 6-0B/format 6-1B differentiation field, and the ninth field is the HARQ process number field.

For another example, the eighth field is the flag format 6-0B/format 6-1B differentiation field, and the ninth field is the repetition number field.

For another example, the eighth field is the modulation and coding scheme field, and the ninth field is the HARQ process number field.

For another example, the eighth field is the modulation and coding scheme field, and the ninth field is the repetition number field.

For another example, the eighth field is the repetition number field, and the ninth field is the HARQ process number field.

Optionally, in some embodiments of this application, when the downlink control information is used for resource block allocation, the downlink control information includes a field indicating the index of the narrowband; or when the downlink control information is used for subcarrier resource allocation, the downlink control information does not include a field indicating the index of the narrowband.

Optionally, in some embodiments of this application, when the downlink control information is used for resource block allocation, the downlink control information includes a narrowband resource adjustment field; or when the downlink control information is used for subcarrier resource allocation, the downlink control information does not include a narrowband resource adjustment field. Alternatively, when the downlink control information is used for resource block allocation, the downlink control information does not include a narrowband resource adjustment field; or when the downlink control information is used for subcarrier resource allocation, the downlink control information includes a narrowband resource adjustment field. The narrowband resource adjustment field is a field used to indicate whether a narrowband is offset, a narrowband offset direction, or a narrowband offset magnitude.

Further, in some embodiments of this application, K=2, M=3, L=4, and the subcarrier resource allocated by using the resource allocation field is three subcarriers or six subcarriers; or K=2, M=3, L=5, the subcarrier resource allocated by using the resource allocation field is three subcarriers or six subcarriers, and the resource allocation field indicates a quantity of resource units.

For example, when K=2, M=3, L=4, and the resource allocation field is used to indicate the allocated resource block(s), the terminal device may determine that the resource block(s) allocated by using the resource allocation field is one or two resource blocks in the narrowband corresponding to the index, of the narrowband, that is indicated by the $$\left\lceil \log_2 \left\lfloor \frac{N_{RB}^{UL}}{6} \right\rfloor \right\rceil$$

high-order bits; or when K=2, M=3, L=4, and the resource allocation field is used to indicate the allocated subcarrier resource, the terminal device may determine that the subcarrier resource allocated by using the resource allocation field is three subcarriers or six subcarriers in two resource blocks. When K=2, M=3, L=5, and the resource allocation field is used to indicate the allocated resource block(s), the terminal device may determine that the resource block(s) allocated by using the resource allocation field is one or two resource blocks in the narrowband corresponding to the index, of the narrowband, that is indicated by the $$\left\lceil \log_2 \left\lfloor \frac{N_{RB}^{UL}}{6} \right\rfloor \right\rceil$$

high-order bits; or when K=2, M=3, L=5, and the resource allocation field is used to indicate the allocated subcarrier resource, the terminal device may determine that the subcarrier resource allocated by using the resource allocation field is three subcarriers or six subcarriers in two resource blocks, and the resource allocation field can indicate two quantities of resource units.

Further, optionally, when the resource allocation field is used to indicate the allocated resource block(s), an uplink resource allocation type 2 is used.

Further, optionally, when the resource allocation field is used to indicate the allocated subcarrier resource, the two resource blocks are resource blocks configured by the network or preset resource blocks.

Further, optionally, the two resource blocks may be in the narrowband corresponding to the index, of the narrowband, that is indicated by the $$\left\lceil \log_2 \left\lfloor \frac{N_{RB}^{UL}}{6} \right\rfloor \right\rceil$$

high-order bits, or may be any two resource blocks on the system bandwidth.

Further, in some embodiments of this application, when K=2, M=3, and L=4, the downlink control information further includes a fifth field, and the terminal device may determine, based on a bit state of the fifth field, the quantity of resource units indicated by the network device. A size of the fifth field is 1 bit, the fifth field indicates the quantity of resource units, and two states corresponding to the 1 bit indicate two quantities of resource units.

Further, optionally, the two quantities of resource units may be 1 and 2.

302: The terminal device determines an allocated resource based on the downlink control information, and sends information on the allocated resource.

In this embodiment of the present invention, the network device can indicate, by using the resource allocation field, to perform resource allocation by using the resource block as the unit, or indicate, by using the resource allocation field, to perform resource allocation by using the subcarrier resource as the unit, and determine the allocated resource by using the states of the high-order bits and low-order bits that are included in the resource allocation field. The terminal device may send the uplink information by using the resource allocated by the network device.

It can be learned from the example descriptions for this application in the foregoing embodiment that the network device indicates, by using different values of the bit states of the resource allocation field, to allocate the resource block(s) or the subcarrier resource to the terminal device. When the resource allocation field is used to indicate the allocated resource block(s), the resource allocation field includes the $\left\lceil \log_2 \left\lfloor \frac{N_{RB}^{UL}}{6} \right\rfloor \right\rceil$ high-order bits and the M+X low-order bits, the $\left\lceil \log_2 \left\lfloor \frac{N_{RB}^{UL}}{6} \right\rfloor \right\rceil$ high-order bits indicate the index of the narrowband, the M high-order bits in the M+X low-order bits indicate the resource allocation in the narrowband, and the quantity of resource blocks indicated by the resource allocation field is greater than or equal to 1; or when the resource allocation field is used to indicate the allocated subcarrier resource, the resource allocation field includes the $\left\lceil \log_2 \left\lfloor \frac{N_{RB}^{UL}}{6} \right\rfloor \right\rceil$ high-order bits and the L low-order bits, the $\left\lceil \log_2 \left\lfloor \frac{N_{RB}^{UL}}{6} \right\rfloor \right\rceil$ high-order bits indicate the index of the narrowband, the L low-order bits indicate the subcarrier resource allocation in the K resource blocks, and the quantity of subcarriers indicated by the resource allocation field is less than 12. In this way, a resource smaller than 12 subcarriers can be allocated, so that effective resources can be allocated to more UEs, and spectral efficiency is improved.

Figure 4:
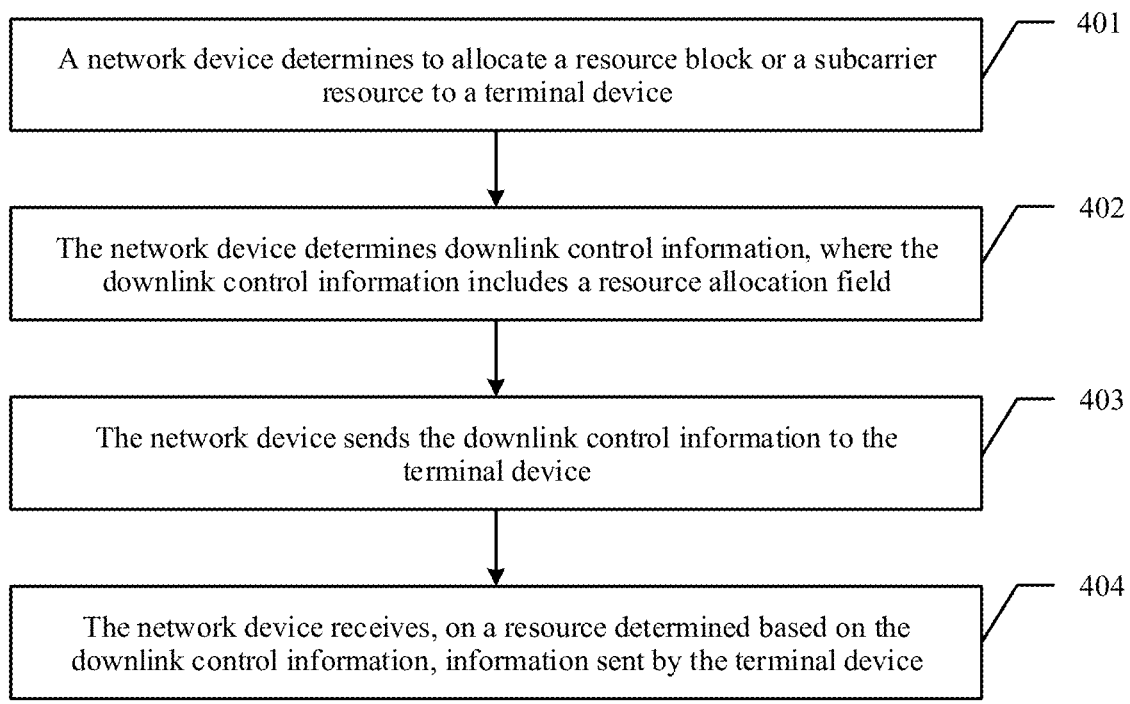
FIG. 4 is a schematic block flowchart of another information transmission method according to an embodiment of this application.

The foregoing embodiment describes, from the perspective of the terminal device, the information transmission method provided in the embodiments of this application. The following describes, from a perspective of a network device, the information transmission method provided in the embodiments of this application. Referring to FIG. 4, an embodiment of this application provides an information transmission method, including the following steps.

401: A network device determines to allocate resource block(s) or a subcarrier resource to a terminal device.

402: The network device determines downlink control information, where the downlink control information includes a resource allocation field, and the resource allocation field is used to indicate the allocated resource block(s) or subcarrier resource.

When the resource allocation field is used to indicate the allocated resource block(s), the resource allocation field includes $\left\lceil \log_2 \left\lfloor \frac{N_{RB}^{UL}}{6} \right\rfloor \right\rceil$ high-order bits and M+X low-order bits, the $\left\lceil \log_2 \left\lfloor \frac{N_{RB}^{UL}}{6} \right\rfloor \right\rceil$ high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $\left\lceil \log_2 \left\lfloor \frac{N_{RB}^{UL}}{6} \right\rfloor \right\rceil$ high-order bits and L low-order bits, the $\left\lceil \log_2 \left\lfloor \frac{N_{RB}^{UL}}{6} \right\rfloor \right\rceil$ high-order bits indicate an index of a narrowband, the L low-order bits indicate subcarrier resource allocation in K resource blocks, a quantity of subcarriers indicated by the resource allocation field is less than 12, L is a positive integer, and K is a positive integer.

In some embodiments of this application, the terminal device is at a coverage enhancement level 0 or a coverage enhancement level 1, or in a coverage enhancement mode A; the downlink control information further includes a first field, and a size of the first field is 2 bits; the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In some embodiments of this application, a bit state 00 of the first field indicates that the resource allocation field is used to indicate the allocated resource block(s); or a bit state 11 of the first field indicates that the resource allocation field is used to indicate the allocated resource block(s).

In some embodiments of this application, K=5, M=5, L=5, and the subcarrier resource indicated by the resource allocation field is three subcarriers or six subcarriers; K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

Further, in some embodiments of this application, when K=5, M=5, L=5, and the subcarrier resource allocated by using the resource allocation field is three subcarriers, the downlink control information further includes a second field, and the second field indicates the terminal device to transmit information by using the three subcarriers or transmit information by using two consecutive subcarriers in the three subcarriers; when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits information by using two consecutive subcarriers in the three subcarriers, or when the modulation scheme is quadrature phase shift keying QPSK modulation, the terminal device transmits information by using the three subcarriers, where Pi/2 represents that a rotation angle is 90 degrees; when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In some embodiments of this application, the terminal device is at a coverage enhancement level 2 or a coverage enhancement level 3, or in a coverage enhancement mode B; the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In some embodiments of this application, K=2, M=3, L=4, and the subcarrier resource allocated by using the resource allocation field is three subcarriers or six subcarriers; or K=2, M=3, L=5, the subcarrier resource allocated by using the resource allocation field is three subcarriers or six subcarriers, and the resource allocation field indicates a quantity of resource units.

In some embodiments of this application, K=2, M=3, and L=4, the downlink control information further includes a fifth field, a size of the fifth field is 1 bit, and the fifth field indicates the quantity of resource units.

403: The network device sends the downlink control information to the terminal device.

404: The network device receives, on a resource determined based on the downlink control information, the information sent by the terminal device.

It can be learned from the example descriptions for this application in the foregoing embodiment that the network device indicates, by using different values of the bit states of the resource allocation field, the resource block(s) or subcarrier resource allocated to the terminal device. When the resource allocation field is used to indicate the allocated resource block(s), the resource allocation field includes the $$\left\lceil \log_2\left\lfloor \frac{N_{RB}^{UL}}{6} \right\rfloor \right\rceil$$

high-order bits and the M+X low-order bits, the $$\left\lceil \log_2\left\lfloor \frac{N_{RB}^{UL}}{6} \right\rfloor \right\rceil$$

high-order bits indicate the index of the narrowband, the M high-order bits in the M+X low-order bits indicate the resource allocation in the narrowband, and the quantity of resource blocks indicated by the resource allocation field is greater than or equal to 1; or when the resource allocation field is used to indicate the allocated subcarrier resource, the resource allocation field includes the $$\left\lceil \log_2\left\lfloor \frac{N_{RB}^{UL}}{6} \right\rfloor \right\rceil$$

high-order bits and the L low-order bits, the $$\left\lceil \log_2\left\lfloor \frac{N_{RB}^{UL}}{6} \right\rfloor \right\rceil$$

high-order bits indicate the index of the narrowband, the L low-order bits indicate the subcarrier resource allocation in the K resource blocks, and the quantity of subcarriers indicated by the resource allocation field is less than 12. In this way, a resource smaller than 12 subcarriers can be allocated, so that effective resources can be allocated to more UEs, and spectral efficiency is improved.

It should be noted that, for ease of description, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

The following further provides related apparatuses configured to implement the foregoing solutions, to better implement the foregoing solutions in the embodiments of this application.

Figure 5:
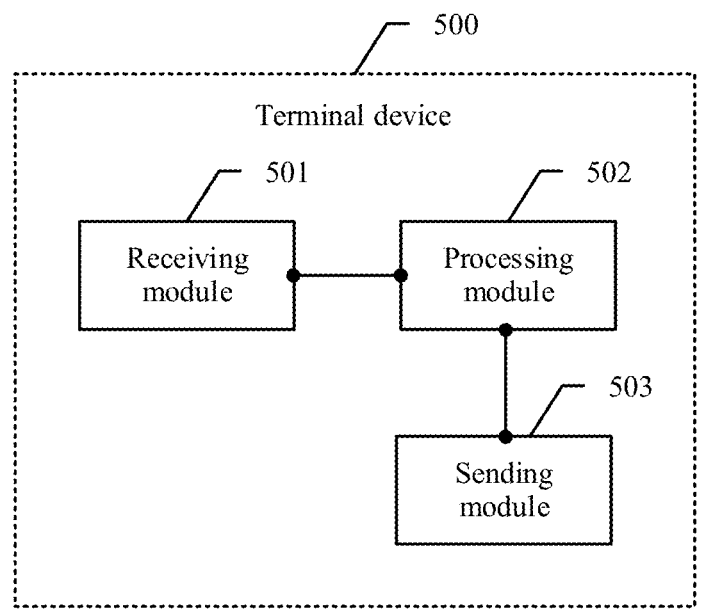
FIG. 5 is a schematic structural composition diagram of a terminal device according to an embodiment of this application.

An embodiment of this application provides a terminal device. As shown in FIG. 5, a terminal device 500 includes:

a receiving module 501, configured to receive downlink control information sent by a network device, where the downlink control information includes a resource allocation field, and the resource allocation field is used to indicate allocated resource block(s) or subcarrier resource; and when the resource allocation field is used to indicate the allocated resource block(s), the resource allocation field includes $$\left\lceil \log_2\left\lfloor \frac{N_{RB}^{UL}}{6} \right\rfloor \right\rceil$$

high-order bits and M+X low-order bits, the $$\left\lceil \log_2\left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;

a processing module 502, configured to determine an allocated resource based on the downlink control information; and a sending module 503, configured to send information on the allocated resource.

In some embodiments of this application, the terminal device is at a coverage enhancement level 0 or a coverage enhancement level 1, or in a coverage enhancement mode A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In some embodiments of this application, a bit state 00 of the first field indicates that the resource allocation field is used to indicate the allocated resource block(s); or a bit state 11 of the first field indicates that the resource allocation field is used to indicate the allocated resource block(s).

In some embodiments of this application, K=5, M=5, L=5, and the subcarrier resource indicated by the resource allocation field is three subcarriers or six subcarriers;

K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

In some embodiments of this application, when K=5, M=5, L=5, and the subcarrier resource allocated by using the resource allocation field is three subcarriers, the downlink control information further includes a second field, and the second field indicates the terminal device to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, where Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In some embodiments of this application, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In some embodiments of this application, K=2, M=3, L=4, and the subcarrier resource allocated by using the resource allocation field is three subcarriers or six subcarriers;

K=2, M=3, L=5, the subcarrier resource allocated by using the resource allocation field is three subcarriers or six subcarriers, and the resource allocation field indicates a quantity of resource units; or K=3, M=3, L=5, and the subcarrier resource allocated by using the resource allocation field is two subcarriers, three subcarriers, or six subcarriers.

In some embodiments of this application, when K=2, M=3, and L=4, or when K=3, M=3, and L=5, the downlink control information further includes a fifth field, a size of the fifth field is 1 bit, and the fifth field indicates the quantity of resource units.

Figure 6:
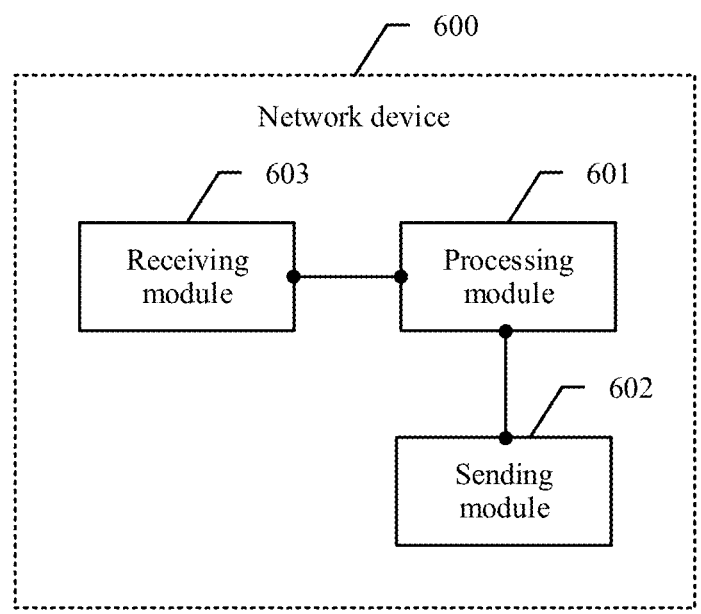
FIG. 6 is a schematic structural composition diagram of a network device according to an embodiment of this application.

In some embodiments of this application, as shown in FIG. 6, an embodiment of this application provides a network device 600, including:

a processing module 601, configured to determine to allocate resource block(s) or a subcarrier resource to a terminal device, where the processing module 601 is configured to determine downlink control information, where the downlink control information includes a resource allocation field, and the resource allocation field is used to indicate the allocated resource block(s) or subcarrier resource; and when the resource allocation field is used to indicate the allocated resource block(s), the resource allocation field includes $$\left\lceil \log_2 \left\lfloor \frac{N_{RB}^{UL}}{6} \right\rfloor \right\rceil$$

high-order bits and M+X low-order bits, the $$\left\lceil \log_2 \left\lfloor \frac{N_{RB}^{UL}}{6} \right\rfloor \right\rceil$$

high-order bits indicate an index of a narrowband, M high-order bits in the M+X low-order bits indicate resource allocation in the narrowband, a quantity of resource blocks indicated by the resource allocation field is greater than or equal to 1, M is a positive integer, X is an integer greater than or equal to 0, and $N_{RB}^{UL}$ represents a quantity of resource blocks included in uplink bandwidth; or when the resource allocation field is used to indicate the allocated subcarrier resource, the resource allocation field includes $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;

a sending module 602, configured to send the downlink control information to the terminal device; and a receiving module 603, configured to receive, on a resource determined based on the downlink control information, information sent by the terminal device.

In some embodiments of this application, the terminal device is at a coverage enhancement level 0 or a coverage enhancement level 1, or in a coverage enhancement mode A;

the downlink control information further includes a first field, and a size of the first field is 2 bits;

the first field has three bit states respectively indicating three different quantities of resource units, and/or the first field has one bit state indicating that the resource allocation field is used to indicate the allocated resource block(s); and when the first field indicates a quantity of resource units, the resource allocation field indicates the subcarrier resource allocation.

In some embodiments of this application, a bit state 00 of the first field indicates that the resource allocation field is used to indicate the allocated resource block(s); or a bit state 11 of the first field indicates that the resource allocation field is used to indicate the allocated resource block(s).

In some embodiments of this application, K=5, M=5, L=5, and the subcarrier resource indicated by the resource allocation field is three subcarriers or six subcarriers;

K=3, M=5, L=5, and the subcarrier resource indicated by the resource allocation field is two subcarriers, three subcarriers, or six subcarriers; or K=6, M=5, L=6, and the subcarrier resource indicated by the resource allocation field is two subcarriers, three subcarriers, or six subcarriers.

In some embodiments of this application, when K=5, M=5, L=5, and the subcarrier resource allocated by using the resource allocation field is three subcarriers, the downlink control information further includes a second field, and the second field indicates the terminal device to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further includes a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, where Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, where H is a value determined based on a cell identifier, and the value of H is 0 or 1.

In some embodiments of this application, the terminal device is at a coverage enhancement level 2 or a coverage enhancement level 3, or in a coverage enhancement mode B;

the downlink control information further includes a fourth field, and a size of the fourth field is 1 bit; and when a bit state of the fourth field is 0, the resource allocation field is used to indicate the allocated resource block(s); or when a bit state of the fourth field is 1, the resource allocation field is used to indicate the allocated subcarrier resource.

In some embodiments of this application, K=2, M=3, L=4, and the subcarrier resource allocated by using the resource allocation field is three subcarriers or six subcarriers;

K=2, M=3, L=5, the subcarrier resource allocated by using the resource allocation field is three subcarriers or six subcarriers, and the resource allocation field indicates a quantity of resource units; or K=3, M=3, L=5, and the subcarrier resource allocated by using the resource allocation field is two subcarriers, three subcarriers, or six subcarriers.

In some embodiments of this application, when K=2, M=3, and L=4, or when K=3, M=3, and L=5, the downlink control information further includes a fifth field, a size of the fifth field is 1 bit, and the fifth field indicates the quantity of resource units.

It should be noted that content such as information exchange between the modules/units of the apparatus and the execution processes thereof is based on the same idea as the method embodiments of the present invention, and produces the same technical effects as the method embodiments of the present invention. For the specific content, reference may be made to the foregoing description in the method embodiments of the present invention, and the details are not described herein again.

An embodiment of this application further provides a computer storage medium. The computer storage medium stores a program, and the program is executed to perform some or all of the steps described in the foregoing method embodiments.

Figure 7:
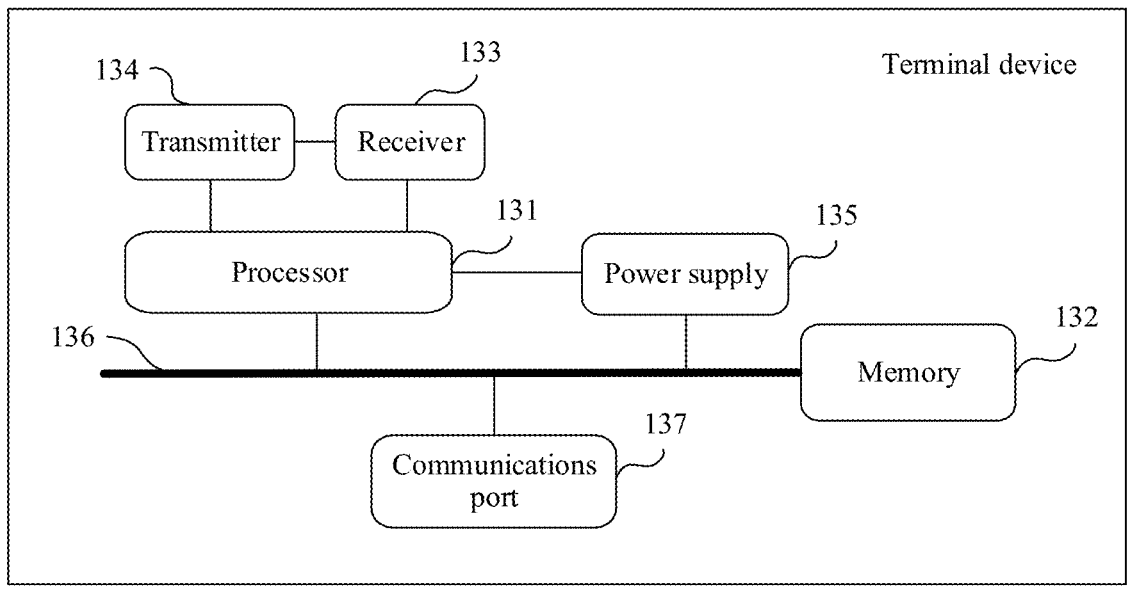
FIG. 7 is a schematic structural composition diagram of another terminal device according to an embodiment of this application.

FIG. 7 is a schematic structural diagram of another device according to an embodiment of this application. The device is a terminal device, and the terminal device may include a processor 131 (for example, a central processing unit (CPU)), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed random-access memory (RAM) memory, and may further include a non-volatile memory (NVM), for example, at least one magnetic disk memory. The memory 132 may store various instructions, to complete various processing functions and implement the method steps in the embodiments of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be a receive antenna and a transmit antenna that are independent of each other on the terminal device. The communications bus 136 is configured to implement communication connections between the components. The communications port 137 is configured to implement connection and communication between the terminal device and another peripheral.

In this embodiment of this application, the memory 132 is configured to store computer-executable program code, and the program code includes an instruction. When the processor 131 executes the instruction, the instruction enables the processor 131 to perform a processing action of the terminal device in the foregoing method embodiments, and enables the transmitter 134 to perform a sending action of the terminal device in the foregoing method embodiments. Their implementation principles and technical effects are similar. Details are not described herein again.

Figure 8:
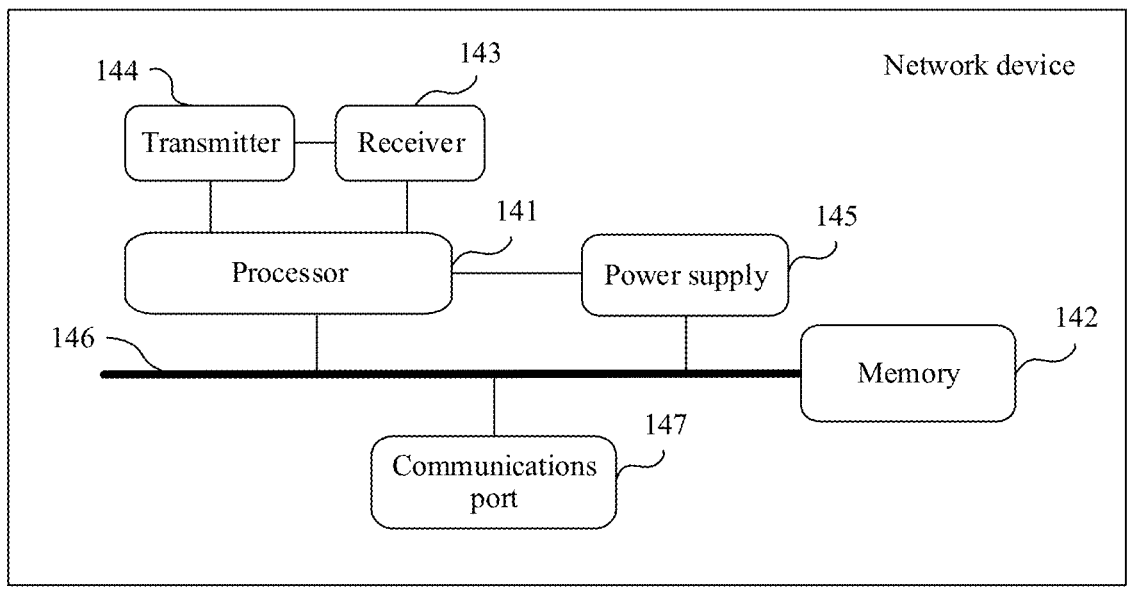
FIG. 8 is a schematic structural composition diagram of another network device according to an embodiment of this application.

FIG. 8 is a schematic structural diagram of another device according to an embodiment of this application. The device is a network device, and the network device may include a processor 141 (for example, a CPU), a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, and may further include a non-volatile memory (NVM), for example, at least one magnetic disk memory. The memory 142 may store various instructions, to complete various processing functions and implement the method steps in the embodiments of this application. Optionally, the network device in this embodiment of this application may further include one or more of a power supply 145, a communications bus 146, and a communications port 147. The receiver 143 and the transmitter 144 may be integrated into a transceiver of the network device, or may be a receive antenna and a transmit antenna that are independent of each other on the network device. The communications bus 146 is configured to implement communication connections between the components. The communications port 147 is configured to implement connection and communication between the network device and another peripheral.

In this embodiment of this application, the memory 142 is configured to store computer-executable program code, and the program code includes an instruction. When the processor 141 executes the instruction, the instruction enables the processor 141 to perform a processing action of the network device in the foregoing method embodiments, and enables the transmitter 144 to perform a sending action of the network device in the foregoing method embodiments. Their implementation principles and technical effects are similar. Details are not described herein again.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the chip in the terminal to perform the information transmission according to the embodiments of this application. Optionally, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the information transmission according to the embodiments of this application.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present invention without creative efforts.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (a digital video disc (DVD)), a semiconductor medium (for example, a solid-state drive (SSD)), or the like.

What is claimed is:

1. An information transmission method, comprising:
receiving downlink control information from a network device, wherein the downlink control information comprises a resource allocation field, and wherein the resource allocation field is used to indicate one or more resource blocks or a subcarrier resource allocated to a terminal device;
determining an allocated resource based on the downlink control information; and
sending information on the allocated resource,
wherein:
(i) the resource allocation field is used to indicate the one or more allocated resource, the resource allocation field comprises $$\left\lceil \log_2 \left\lfloor \frac{N_{RB}^{UL}}{6} \right\rfloor \right\rceil$$

high-order bits and M low-order bits, the $$\left\lceil \log_2 \left\lfloor \frac{N_{RB}^{UL}}{6} \right\rfloor \right\rceil$$

high-order bits indicate an index of a narrowband, the M low-order bits indicate resource allocation in the narrowband, a quantity of resource blocks indicated by the resource allocation field is greater than or equal to 1, M is a positive integer, and $N_{RB}^{UL}$ represents a quantity of resource blocks comprised in uplink bandwidth, or
(ii) the resource allocation field is used to indicate the allocated subcarrier resource, the resource allocation field comprises $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;
wherein the terminal device is at a coverage enhancement level 0, or a coverage enhancement level 1, or in a coverage enhancement mode A;
wherein the downlink control information further comprises a first field, a size of the first field being 2 bits, and
wherein the first field is:
a first, a second, or a third value indicating a quantity of resource units, each of the first, second, and third values respectively indicating a first, a second, and a third quantity of resource units, or
a fourth value indicating that the resource allocation field is used to indicate the one or more allocated resource blocks; and
wherein when the first field is a value indicating a quantity of resource units, the resource allocation field indicates the subcarrier resource allocation.

2. The method according to claim 1, wherein a bit state 00 of the first field or a bit state 11 of the first field indicates that the resource allocation field is used to indicate the one or more allocated resource blocks.

3. The method according to claim 1, wherein K=5, M=5, L=5, and the subcarrier resource indicated by the resource allocation field is three subcarriers or six subcarriers;
wherein K=3, M=5, L=5, and the subcarrier resource indicated by the resource allocation field is two subcarriers, three subcarriers, or six subcarriers; or
wherein K=6, M=5, L=6, and the subcarrier resource indicated by the resource allocation field is two subcarriers, three subcarriers, or six subcarriers.

4. The method according to claim 3, wherein, when the resource allocation field is used to indicate resource allocation performed by using the subcarrier as a unit, and 60 bit states in 64 bit states indicated by the 6 low-order bits are used to indicate resource allocation of two subcarriers, three subcarriers, or six subcarriers in any resource block in the narrowband indicated by the index of the narrowband.

5. The method according to claim 3, wherein when K=5, M=5, L=5, and the subcarrier resource allocated by using the resource allocation field is three subcarriers, the downlink control information further comprises a second field, and the second field indicates the terminal device is to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further comprises a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying (QPSK) modulation, the terminal device transmits the information by using the three subcarriers, wherein Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1.

6. An information transmission method, comprising:

determining one or more resource blocks or a subcarrier resource to be allocated to a terminal device; and determining downlink control information, wherein the downlink control information comprises a resource allocation field, the resource allocation field indicating the one or more allocated resource blocks or the subcarrier resource to be allocated to the terminal device;

sending the downlink control information to the terminal device; and receiving, on a resource determined based on the downlink control information, information from the terminal device, wherein:

(i) the resource allocation field is used to indicate the one or more allocated resource blocks, the resource allocation field comprises $$\left\lceil \log_2 \left\lfloor \frac{N_{RB}^{UL}}{6} \right\rfloor \right\rceil$$

high-order bits and M low-order bits, the $$\left\lceil \log_2 \left\lfloor \frac{N_{RB}^{UL}}{6} \right\rfloor \right\rceil$$

high-order bits indicate an index of a narrowband, the M low-order bits indicate resource allocation in the narrowband, a quantity of resource blocks indicated by the resource allocation field is greater than or equal to 1, M is a positive integer, and $N_{RB}^{UL}$ represents a quantity of resource blocks comprised in uplink bandwidth; or (ii) the resource allocation field is used to indicate the allocated subcarrier resource, the resource allocation field comprises $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;

wherein the terminal device is at a coverage enhancement level 0 or a coverage enhancement level 1, or in a coverage enhancement mode A;

wherein the downlink control information further comprises a first field, a size of the first field being 2 bits, and wherein the first field is:

a first, a second, or a third value indicating a quantity of resource units, each of the first, second, and third values respectively indicating a first, a second, and a third quantity of resource units, or a fourth value indicating that the resource allocation field is used to indicate the one or more allocated resource blocks; and wherein when the first field is a value indicating a quantity of resource units, the resource allocation field indicates the subcarrier resource allocation.

7. The method according to claim 6, wherein a bit state 00 of the first field of a bit state of 11 of the first field indicates that the resource allocation field is used to indicate the one or more allocated resource blocks.

8. The method according to claim 6, wherein K=5, M=5, L=5, and the subcarrier resource indicated by the resource allocation field is three subcarriers or six subcarriers;

wherein K=3, M=5, L=5, and the subcarrier resource indicated by the resource allocation field is two subcarriers, three subcarriers, or six subcarriers; or wherein K=6, M=5, L=6, and the subcarrier resource indicated by the resource allocation field is two subcarriers, three subcarriers, or six subcarriers.

9. The method according to claim 8, wherein when the resource allocation field is used to indicate resource allocation performed by using the subcarrier as a unit, and 60 bit states in 64 bit states indicated by the 6 low-order bits are used to indicate resource allocation of two subcarriers, three subcarriers, or six subcarriers in any resource block in the narrowband indicated by the index of the narrowband.

10. The method according to claim 8, wherein when K=5, M=5, L=5, and the subcarrier resource allocated by using the resource allocation field is three subcarriers, the downlink control information further comprises a second field, and the second field indicates the terminal device is to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further comprises a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, wherein Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1.

11. A communications device, comprising:
at least one processor, and
a storage memory coupled to the at least one processor and storing programming instructions that, when executed by the at least one processor, cause the at least one processor to:
receive downlink control information from a network device, wherein the downlink control information comprises a resource allocation field, the resource allocation field being used to indicate one or more resource blocks or a subcarrier resource allocated to the communications device;
determine an allocated resource based on the downlink control information; and
send information on the allocated resource,
wherein:
(i) the resource allocation field is used to indicate the one or more allocated resource blocks, the resource allocation field comprises $$\left\lceil \log_2 \left\lfloor \frac{N_{RB}^{UL}}{6} \right\rfloor \right\rceil$$

high-order bits and M low-order bits, the $$\left\lceil \log_2 \left\lfloor \frac{N_{RB}^{UL}}{6} \right\rfloor \right\rceil$$

high-order bits indicate an index of a narrowband, the M low-order bits indicate resource allocation in the narrowband, a quantity of resource blocks indicated by the resource allocation field is greater than or equal to 1, M is a positive integer, and $N_{RB}^{UL}$ represents a quantity of resource blocks comprised in uplink bandwidth; or (ii) the resource allocation field is used to indicate the allocated subcarrier resource, the resource allocation field comprises $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;
wherein the terminal device is at a coverage enhancement level 0 or a coverage enhancement level 1, or in a coverage enhancement mode A;
wherein the downlink control information further comprises a first field, a size of the first field being 2 bits, and
wherein the first field is:
a first, a second, or a third value indicating a quantity of resource units, each of the first, second, and third values respectively indicating a first, a second, and a third quantity of resource units, or
a fourth value indicating that the resource allocation field is used to indicate the one or more allocated resource blocks; and
wherein when the first field is a value indicating a quantity of resource units, the resource allocation field indicates the subcarrier resource allocation.

12. The communications device according to claim 11, wherein a bit state 00 of the first field or a bit state 11 of the first field indicates that the resource allocation field is used to indicate the one or more allocated resource blocks.

13. The communications device according to claim 11, wherein K=5, M=5, L=5, and the subcarrier resource indicated by the resource allocation field is three subcarriers or six subcarriers;
wherein K=3, M=5, L=5, and the subcarrier resource indicated by the resource allocation field is two subcarriers, three subcarriers, or six subcarriers; or
wherein K=6, M=5, L=6, and the subcarrier resource indicated by the resource allocation field is two subcarriers, three subcarriers, or six subcarriers.

14. The communications device according to claim 13, wherein when the resource allocation field is used to indicate resource allocation performed by using the subcarrier as a unit, and 60 bit states in 64 bit states indicated by the 6 low-order bits are used to indicate resource allocation of two subcarriers, three subcarriers, or six subcarriers in any resource block in the narrowband indicated by the index of the narrowband.

15. The communications device according to claim 13, wherein when K=5, M=5, L=5, and the subcarrier resource allocated by using the resource allocation field is three subcarriers, the downlink control information further comprises a second field, and the second field indicates the communications device to transmit the information by using the three subcarriers or transmit the information by using two consecutive subcarriers in the three subcarriers;
  when K=5, M=5, L=5, and the subcarrier resource allocated by using the resource allocation field is three subcarriers, the downlink control information further comprises a third field, the third field indicates a modulation scheme for information transmission to be performed by the communications device, and when the modulation scheme is Pi/2 BPSK modulation, the communications device transmits the information by using two consecutive subcarriers in the three subcarriers, or when the modulation scheme is quadrature phase shift keying QPSK modulation, the communications device transmits the information by using the three subcarriers, wherein Pi/2 represents that a rotation angle is 90 degrees;
  when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1; or
  when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1.

16. A network device, comprising:
at least one processor, and
a storage memory coupled to the at least one processor and storing programming instructions that, when executed by the at least one processor, cause the at least one processor to:
  determine one or more resource blocks or a subcarrier resource to a terminal device, and
  determine downlink control information that includes a resource allocation field, the resource allocation field being used to indicate the one or more allocated resource blocks or the subcarrier resource;
send the downlink control information to the terminal device; and
receive, on a resource determined based on the downlink control information, information from the terminal device,
wherein:
  (i) when the resource allocation field is used to indicate the one or more allocated resource blocks, the resource allocation field comprises $$\left\lceil \log_2 \left\lfloor \frac{N_{RB}^{UL}}{6} \right\rfloor \right\rceil$$

high-order bits and M low-order bits, the $$\left\lceil \log_2 \left\lfloor \frac{N_{RB}^{UL}}{6} \right\rfloor \right\rceil$$

high-order bits indicate an index of a narrowband, the M low-order bits indicate resource allocation in the narrowband, a quantity of resource blocks indicated by the resource allocation field is greater than or equal to 1, M is a positive integer, and $N_{RB}^{UL}$ represents a quantity of resource blocks comprised in uplink bandwidth; or
  (ii) the resource allocation field is used to indicate the allocated subcarrier resource, the resource allocation field comprises $$\left\lceil \log_2 \left\lfloor \frac{N_{RB}^{UL}}{6} \right\rfloor \right\rceil$$

high-order bits and L low-order bits, the $$\left\lceil \log_2 \left\lfloor \frac{N_{RB}^{UL}}{6} \right\rfloor \right\rceil$$

high-order bits indicate an index of a narrowband, the L low-order bits indicate subcarrier resource allocation in K resource blocks, a quantity of subcarriers indicated by the resource allocation field is less than 12, L is a positive integer, and K is a positive integer;
  wherein the terminal device is at a coverage enhancement level 0 or a coverage enhancement level 1, or in a coverage enhancement mode A;
  wherein the downlink control information further comprises a first field, a size of the first field being 2 bits, and
  wherein the first field is:
    a first, a second, or a third value indicating a quantity of resource units, each of the first, second, and third values respectively indicating a first, a second, and a third quantity of resource units, or
    a fourth value indicating that the resource allocation field is used to indicate the one or more allocated resource blocks; and
  wherein when the first field is a value indicating a quantity of resource units, the resource allocation field indicates the subcarrier resource allocation.

17. The network device according to claim 16, wherein the fourth value is a bit state 00 of the first field or a bit state of 11 of the first field.

18. The network device according to claim 16, wherein K=5, M=5, L=5, and the subcarrier resource indicated by the resource allocation field is three subcarriers or six subcarriers;
  wherein K=3, M=5, L=5, and the subcarrier resource indicated by the resource allocation field is two subcarriers, three subcarriers, or six subcarriers; or
  wherein K=6, M=5, L=6, and the subcarrier resource indicated by the resource allocation field is two subcarriers, three subcarriers, or six subcarriers.

19. The network device according to claim 18, wherein when the resource allocation field is used to indicate resource allocation performed by using the subcarrier as a unit, and 60 bit states in 64 bit states indicated by the 6 low-order bits are used to indicate resource allocation of two subcarriers, three subcarriers, or six subcarriers in any resource block in the narrowband indicated by the index of the narrowband.

20. The network device according to claim 18, wherein when K=5, M=5, L=5, and the subcarrier resource allocated by using the resource allocation field is three subcarriers, the downlink control information further comprises a second field, and the second field indicates the terminal device is to transmit the information by using the three subcarriers or transmit the information by using two consecutive subcarriers in the three subcarriers;

when K=5, M=5, L=5, and the subcarrier resource allocated by using the resource allocation field is three subcarriers, the downlink control information further comprises a third field, the third field indicates a modulation scheme for information transmission to be performed by the terminal device, and when the modulation scheme is Pi/2 BPSK modulation, the terminal device transmits the information by using two consecutive subcarriers in the three subcarriers, or when the modulation scheme is quadrature phase shift keying QPSK modulation, the terminal device transmits the information by using the three subcarriers, wherein Pi/2 represents that a rotation angle is 90 degrees;

when K=3, M=5, L=5, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1; or when K=6, M=5, L=6, and the subcarrier resource allocated by using the resource allocation field is two subcarriers, subcarrier indexes of the two subcarriers in a resource block to which the two subcarriers belong are {0, 1}+H, {3, 4}+H, {6, 7}+H, or {9, 10}+H, wherein H is a value determined based on a cell identifier, and the value of H is 0 or 1.

\* \* \* \* \*